(12) United States Patent
Sayenko et al.

(10) Patent No.: US 12,432,663 B2
(45) Date of Patent: Sep. 30, 2025

(54) SYSTEMS AND METHODS FOR HIGH-POWER TRANSMISSION

(71) Applicant: Apple Inc., Cupertino, CA (US)

(72) Inventors: Alexander Sayenko, Munich (DE); Anatoliy S Ioffe, Sunnyvale, CA (US); Daniel Popp, Munich (DE); Fucheng Wang, Cupertino, CA (US); Sumit Verma, San Diego, CA (US)

(73) Assignee: Apple Inc., Cupertino, CA (US)

( * ) Notice: Subject to any disclaimer, the term of this patent is extended or adjusted under 35 U.S.C. 154(b) by 352 days.

(21) Appl. No.: 18/301,124

(22) Filed: Apr. 14, 2023

(65) Prior Publication Data

US 2024/0284339 A1 Aug. 22, 2024

Related U.S. Application Data

(60) Provisional application No. 63/485,504, filed on Feb. 16, 2023.

(51) Int. Cl.
*H04W 52/14* (2009.01)
*H04W 28/02* (2009.01)
(Continued)

(52) U.S. Cl.
CPC ..... *H04W 52/146* (2013.01); *H04W 28/0278* (2013.01); *H04W 72/1268* (2013.01); *H04W 72/23* (2023.01)

(58) Field of Classification Search
CPC ... H04W 52/14; H04W 52/146; H04W 28/02; H04W 28/0278; H04W 72/1268; H04W 72/23
See application file for complete search history.

(56) References Cited

U.S. PATENT DOCUMENTS 11,129,109 B2 * 9/2021 Zacharias ............. H04W 52/10
11,533,686 B2 * 12/2022 Zhou .................... H04L 1/0003
(Continued)

FOREIGN PATENT DOCUMENTS

WO      2017197096 A1     11/2017
WO   WO-2019221910 A1 *  11/2019  ............. G01S 7/006
WO   WO-2021021892 A1 *   2/2021  ............ H04L 5/0007

OTHER PUBLICATIONS

Partial European Search Report for European Patent Application No. 24154949.2 dated Jul. 1, 2024; 15 pgs.
(Continued)

*Primary Examiner* — Hai V Nguyen
(74) *Attorney, Agent, or Firm* — FLETCHER YODER PC

(57) ABSTRACT

User equipment may include a transmitter coupled to an antenna to enable the user equipment to transmit data with a communication node and/or a non-terrestrial network. The user equipment may transmit using high power over a period of time such that the transmission power of the user equipment is below an emission threshold. For example, the user equipment may adjust a buffer status report to reduce uplink allocation frequency. In another example, the user equipment may determine a duty cycle and transmit the data using high power based on the duty cycle. In another example, the user equipment may determine a priority of uplink symbols and transmit certain uplink symbols using high power. In this way, the user equipment may transmit using high power and may improve transmission range to the non-terrestrial network and/or a likelihood that transmissions may be received by the network while remaining within the emission threshold.

20 Claims, 16 Drawing Sheets

(51) Int. Cl.
*H04W 72/1268* (2023.01)
*H04W 72/23* (2023.01)

(56) References Cited

U.S. PATENT DOCUMENTS

| | | | | |
|---|---|---|---|---|
| 11,546,791 | B2* | 1/2023 | Zhang | H04W 24/10 |
| 11,594,807 | B2* | 2/2023 | Ng | G01S 7/417 |
| 11,617,180 | B2* | 3/2023 | Zhou | H04W 72/53 370/329 |
| 11,683,839 | B2* | 6/2023 | Taherzadeh Boroujeni | H04W 74/006 370/329 |
| 11,689,234 | B2* | 6/2023 | Kaidar | H04W 52/44 455/127.1 |
| 11,689,235 | B2* | 6/2023 | Zhou | H04W 72/23 370/329 |
| 11,690,084 | B2* | 6/2023 | Zhou | H04W 72/044 455/450 |
| 11,849,309 | B2* | 12/2023 | Yu | H04B 17/26 |
| 11,864,020 | B2* | 1/2024 | Dsouza | H04L 43/0888 |
| 11,909,646 | B2* | 2/2024 | Rutkowski | H04L 47/122 |
| 11,917,609 | B2* | 2/2024 | Guo | H04W 52/267 |
| 11,924,819 | B2* | 3/2024 | Cai | H04W 72/56 |
| 12,021,796 | B2* | 6/2024 | Han | H04B 17/102 |
| 12,069,639 | B2* | 8/2024 | Nam | H04W 72/12 |
| 12,089,164 | B2* | 9/2024 | Ding | H04W 52/365 |
| 12,219,501 | B2* | 2/2025 | Yuan | H04W 52/242 |
| 12,309,864 | B2* | 5/2025 | Zhang | H04W 76/16 |
| 2016/0100360 | A1* | 4/2016 | Liu | H04W 72/21 370/311 |
| 2017/0332333 | A1* | 11/2017 | Santhanam | H04L 5/14 |
| 2019/0364492 | A1 | 11/2019 | Azizi et al. | |
| 2020/0359330 | A1* | 11/2020 | Zacharias | H04W 52/367 |
| 2022/0191730 | A1* | 6/2022 | Meylan | H04W 28/0268 |
| 2023/0012050 | A1* | 1/2023 | Dalmiya | H04W 28/0942 |
| 2023/0016288 | A1* | 1/2023 | Chauvin | H04W 52/367 |
| 2023/0389087 | A1* | 11/2023 | Taherzadeh Boroujeni | H04W 74/0841 |

OTHER PUBLICATIONS

RP-211601, "WID on NB-IoT/eMTC support for NTN," 3GPP TSG RAN Meeting #92-e, Electronic Meeting, Jun. 14-18, 2021, pp. 1-6.
3GPP TR 36.763 V0.0.1, "Study on Narrow-Band Internet of Things (NB-IoT) / enhanced Machine Type Communication (eMTC) support for Non-Terrestrial Networks (NTN) (Release 17)," Jan. 2021, pp. 1-12.
RP-223534, "Revised WID: NR NTN (Non-Terrestrial Networks) enhancements," 3GPP TSG RAN Meeting #98-e, Electronic Meeting, Dec. 12-16, 2022, pp. 1-8.
3GPP TR 38.811 V15.4.0, "Study on New Radio (NR) to support non-terrestrial networks (Release 15)," Sep. 2020, pp. 1-127.
3GPP TR 38.821 V16.1.0, "Solutions for NR to support non-terrestrial networks (NTN) (Release 16)," May 2021, pp. 1-52.
ETSI EN 301 681 V2.1.2 (Nov. 2016); Satellite Earth Stations and Systems (SES); Harmonised Standard for Mobile Earth Stations (MES) of Geostationary mobile satellite systems, including hand-held earth stations, for Satellite Personal Communications Networks (S-PCN) under the Mobile Satellite Service (MSS).

* cited by examiner

SYSTEMS AND METHODS FOR HIGH-POWER TRANSMISSION

CROSS-REFERENCE TO RELATED APPLICATIONS

This application claims priority to U.S. Provisional Application No. 63/485,504, filed Feb. 16, 2023, entitled "Systems and Methods for High-Power Transmission," the disclosure of which is incorporated by reference in its entirety for all purposes.

BACKGROUND

The present disclosure relates generally to wireless communication, and more specifically to high-power transmission from wireless communication devices to non-terrestrial networks.

Wireless communication devices (e.g., user equipment) may transmit and receive wireless signals to and from a non-terrestrial network (NTN). In particular, $3^{rd}$ Generation Partnership Project (3GPP) standards may define one or more frequency ranges and/or bands for uplink transmissions to a satellite of the NTN. For example, the 3GPP may assign frequency bands (e.g., that are within 1.5-2.5 gigahertz (GHz)) to handheld or wireless communication devices (e.g., user equipment). Due to long distances between the device and the satellite, transmitting at high transmission power may improve transmission range and/or reliability. However, existing standards and/or regulations may limit transmission power of the user equipment when transmitting on the satellite bands, which may impact the signal transmissions between the user equipment and non-terrestrial networks (e.g., as supported by satellites, communication nodes).

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a user equipment may include a transceiver and processing circuitry coupled to the transceiver. The processing circuitry may detect a first communication node using the transceiver, synchronize to the first communication node using the transceiver, and receive an indication of a first uplink grant using the transceiver. The processing circuitry may also transmit data using the transceiver and at a transmit power over a first period of time based on the first uplink grant, reduce an amount of second data within an uplink buffer based on the transmit power over the first period of time being greater than a threshold, and transmit a second indication of the second data to the first communication node using the transceiver.

In one embodiment, a method may include receiving, via a receiver of a user equipment, a first indication of a first uplink grant comprising a first uplink allocation frequency for the user equipment, adjusting, via processing circuitry of the user equipment, an amount of data within an uplink buffer based on an average transmission power being above a threshold, and transmitting, via a transmitter of the user equipment, a buffer status report comprising the amount of data within the uplink buffer.

In another embodiment, a method may include establishing, via processing circuitry of a user equipment, a connection with a network and receiving, via a receiver of the user equipment, an indication of a plurality of scheduled uplink grants and a transmission power. Additionally, the method may include determining, via the processing circuitry, a duty cycle for each of the scheduled uplink grants and a threshold based on the indication and transmitting, via a transmitter of the user equipment, data to the network using the transmission power based on the transmission power being less than the threshold and the duty cycle.

In another embodiment, a non-transitory computer-readable medium may include instructions that, when executed may one or more processors, are configured to cause the one or more processors to determine that a transmission power to be used by a transmitter of user equipment is above a threshold based on an indication of allocated resources from a base station, generate a duty cycle based on the transmission power, and transmit data to the base station using the transmission power and the duty cycle.

In another embodiment, a user equipment may include a transceiver and processing circuitry coupled to the transceiver. The processing circuitry may be configured to detect a communication node using the transceiver, synchronize to the communication node using the transceiver, and receive an indication of a scheduled uplink grant comprising a plurality of time slots for transmission and a transmission power using the transceiver. Further, the processing circuitry may be configured to transmit a plurality of uplink symbols during the time slot to the communication node using the transceiver based on the indication of the transmission power, the plurality of uplink symbols comprising a first set of uplink symbols associated with a first transmission power and a second set of uplink symbols associated with a second transmission power.

In yet another embodiment, a method may include receiving, via a receiver of a user equipment, an indication to transmit data over a plurality of time slots and a first transmission power, transmitting, via and a transmitter of the user equipment, the data over a first time slot of the plurality of time slots using a second transmission power based on the first transmission power being above an emission threshold, and transmitting, via the transmitter, the data over remaining time slots of the plurality of time slots using the first transmission power based on the first transmission power being above the emission threshold.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
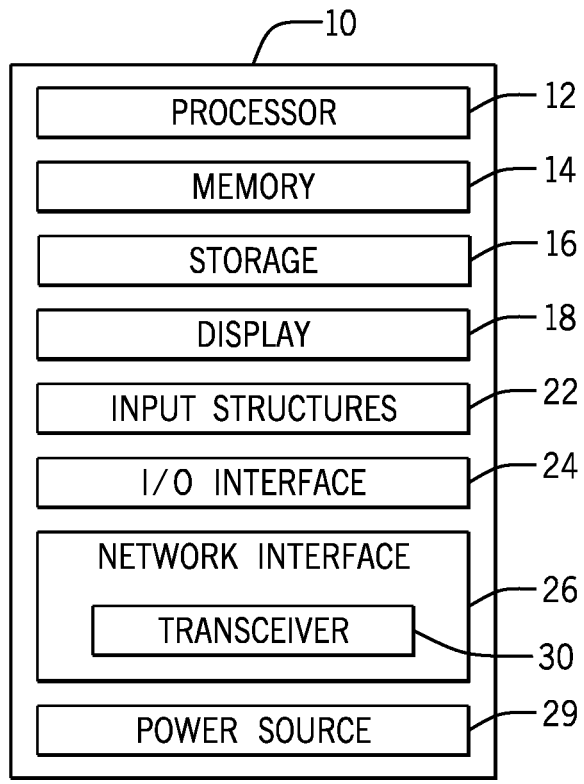
FIG. 1 is a block diagram of a user equipment, according to embodiments of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Additionally, the term "set" may include one or more. That is, a set may include a unitary set of one member, but the set may also include a set of multiple members.

This disclosure is directed to systems and techniques for transmitting wireless signals to a non-terrestrial network (NTN). For example, user equipment may establish a connection with and transmit signals (e.g., uplink transmissions) to a communication node (e.g., base station, access point, non-terrestrial station, satellite, high-altitude platform station, and so on) of the NTN, in accordance with $3^{rd}$ Generation Partnership Project (3GPP) standards. The 3GPP standards may assign frequency ranges and/or bands (e.g., that are within 1.5-2.5 gigahertz (GHz)) for wireless communication between the user equipment and the communication node of the NTN. The frequency range may be further defined by an L-band with frequencies around 1.6 GHz (e.g., band n255), an S-band with frequencies around 2.5 GHZ (e.g., band n256), and so on.

In certain instances, a transmission power of the user equipment during uplink transmissions may be constrained by regulations (e.g., from regulatory bodies). For example, mobile satellite service (MSS) regulations may regulate transmission on low frequency bands by setting forth an antenna shape, direction, and/or a maximum transmission power associated with the uplink transmissions. In another example, regulatory bodies (e.g., Federal Communications Commission (FCC), European Committee for Electrotechnical Standardization (CENELEC)) may define radio frequency exposure or emission limits, such as a specific absorption ratio (SAR), to regulate an allowed exposure of a user to a transmitter in the user equipment. In still another example, the 3GPP NTN specification constrains transmissions to the NTN at a maximum transmission power defined by Power Class 3 (e.g., having a power of +23 decibel milliwatts (dBm)), which may be determined based on the SAR regulation. Moreover, the 3GPP NTN specification assumes a 0 dB antenna gain for certain user equipment (e.g., smartphone form factor) when determining the NTN internet of things (IoT) link budgets (e.g., narrowband internet of things (NB-IoT), enhanced Machine Type Communication (eMTC)). However, the user equipment may experience around-5.5 dB antenna gain during operations. As a result, the NTN IoT link budgets may be limited, and in particular power-starved during the transmissions.

Moreover, the regulations may specify an antenna shape and/or antenna direction for uplink transmissions. For example, the MSS regulations allow for uplink transmissions using omni-directional antennas and PC3, which may reduce uplink coverage in comparison to uplink transmissions using directional antennas and PC3. When operating near a cell edge (e.g., edge of coverage provided by the satellite) and using omni-directional antennas, the user equipment may not transmit signals at a high power to be received by the satellite with a high enough signal-to-noise ratio (SNR), thereby causing the user equipment to lose connection with the satellite and/or the NTN. In other instances, the user equipment may transmit using directional antennas and form a line of sight (LoS) with the satellite for uplink transmissions. The LoS may be blocked by one or more obstacles between the user equipment and the satellite, thus reducing uplink coverage. For example, the LoS may be blocked by obstacles such as trees, buildings, people, cars, and the like in urban environments. In another example, the LoS may be affected by elevation changes caused by hills and mountains, and/or obstacles such as people, animals, trees, and the like in mountainous environment. At elevation angles of 10-40 degrees, the LoS probability may be 25-61% due to blocking and shadowing by the obstacles. In another example, average tree shadowing loss may be 3-4 dB. As such, transmission using PC3 over long distances, such as between the user equipment and the satellite, may be unreliable.

Embodiments of the present disclosure are directed to transmitting with high power. In particular, the 3GPP standards recently introduced requirements for Power Class 2 (e.g., having a power of +26 dBm±2 dB tolerance) in frequency domain duplexing (FDD) bands of terrestrial networks without specifying time-domain restrictions on one or more uplink allocations. In certain instances, the user equipment may transmit with high power (e.g., a transmission power greater than +23 dBm) over a time period and be within the regulations (e.g., SAR regulation). For example, the user equipment may transmit using Power Class 1 (PC1), Power Class 1.5 (PC1.5), and/or Power Class 2 (PC2) over a time period. The user equipment may determine that high power transmissions do not exceed a threshold (e.g., a SAR threshold) if an average power of transmissions over the time period does not exceed the threshold. In an embodiment, the user equipment may manage (e.g., adjust) an uplink buffer and/or buffer status report (BSR) to reduce uplink allocation frequency to the NTN to transmit using high power over a reduced period of time to meet the threshold. In another embodiment, the user equipment may determine a transmission duty cycle based on a maximum transmission power and a threshold to transmit using high power. In an instance, the user equipment may receive an indication of one or more uplink scheduling grants (e.g., from the NTN) and determine the transmission duty cycle based on the uplink scheduling grants to transmit using high power in accordance with the regulations. If the maximum transmission power exceeds the transmission power threshold, the user equipment may apply a power back-off to reduce transmission power. Still in another embodiment, the user equipment may determine a priority for one or more uplink symbols and/or one or more time slots in which the one or more uplink symbols are transmitted (e.g., transmission slots). If the priority for the uplink symbol is below a threshold, the user equipment may transmit the symbol at a lower transmission power and prioritize uplink symbols that are above the threshold. Additionally or alternatively, if the power used to transmit one or more repetitions of one slot of data is greater than a threshold, the user equipment may transmit at least one repetition of the slot of data at lower power and transmit the remaining repetitions of the slot of data at high power. As such, the user equipment may transmit using high power to improve transmission range to the NTN and/or a likelihood that transmissions will be received by the NTN (e.g., transmission reliability) while remaining within regulations.

FIG. 1 is a block diagram of a user equipment 10, according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive signals between one another. It should be noted that FIG. 1 is merely one example of a particular implementation and is intended to illustrate the types of components that may be present in the user equipment 10.

By way of example, the user equipment 10 may include any suitable computing device, including a desktop or notebook computer, a portable electronic or handheld electronic device such as a wireless electronic device or smartphone, a tablet, a wearable electronic device, and other similar devices. In additional or alternative embodiments, the user equipment 10 may include an access point, such as a base station, a router (e.g., a wireless or Wi-Fi router), a hub, a switch, and so on. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the user equipment 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 10 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with the user equipment 10 (e.g., pressing a button to increase or decrease a volume level). The I/O interface 24 may enable user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a 3rd generation (3G) cellular network, universal mobile telecommunication system (UMTS), 4th generation (4G) cellular network, Long Term Evolution® (LTE) cellular network, Long Term Evolution License Assisted Access (LTE-LAA) cellular network, 5th generation (5G) cellular network, and/or New Radio (NR) cellular network, a 6th generation (6G) or greater than 6G cellular network, a satellite network, a non-terrestrial network, and so on. In particular, the network interface 26 may include, for example, one or more interfaces for using a cellular communication standard of the 5G specifications that include the millimeter wave (mmWave) frequency range (e.g., 24.25-300 gigahertz (GHz)) that defines and/or enables frequency ranges used for wireless communication. The network interface 26 of the user equipment 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the user equipment 10 may include any suitable source of power, such as a rechargeable lithium polymer (Li-poly) battery and/or an alternating current (AC) power converter.

Figure 2:
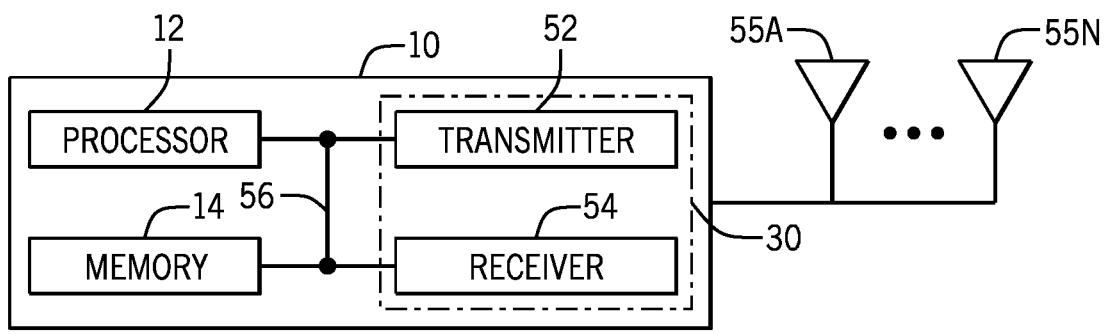
FIG. 2 is a functional diagram of the user equipment of FIG. 1, according to embodiments of the present disclosure.

FIG. 2 is a functional diagram of the user equipment 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive signals between one another.

The user equipment 10 may include the transmitter 52 and/or the receiver 54 that respectively enable transmission and reception of signals between the user equipment 10 and an external device via, for example, a network (e.g., including base stations or access points) or a direct connection. As illustrated, the transmitter 52 and the receiver 54 may be combined into the transceiver 30. The user equipment 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The user equipment 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the user equipment 10 may be coupled together by a bus system 56. The bus system 56 may include a data bus, for example, as well as a power bus, a control signal bus, and a status signal bus, in addition to the data bus. The components of the user equipment 10 may be coupled together or accept or provide inputs to each other using some other mechanism.

Figure 3:
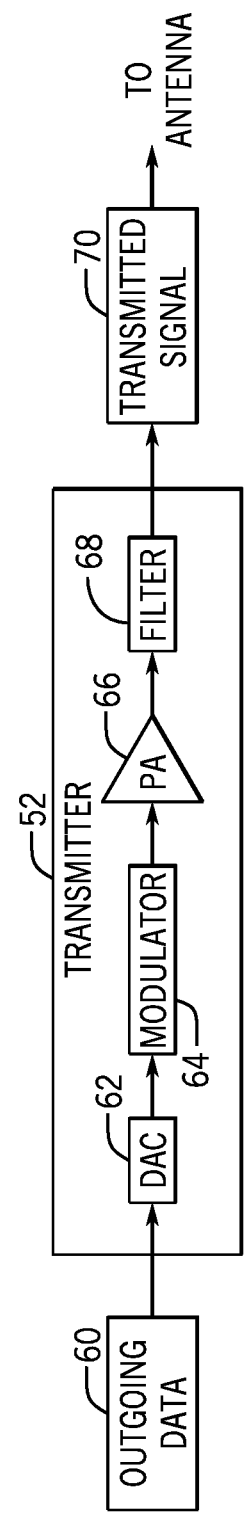
FIG. 3 is a schematic diagram of a transmitter of the user equipment of FIG. 1, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital-toanalog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted signal 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter.

The power amplifier 66 and/or the filter 68 may be referred to as part of a radio frequency front end (RFFE), and more specifically, a transmit front end (TXFE) of the user equipment 10. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

Figure 4:
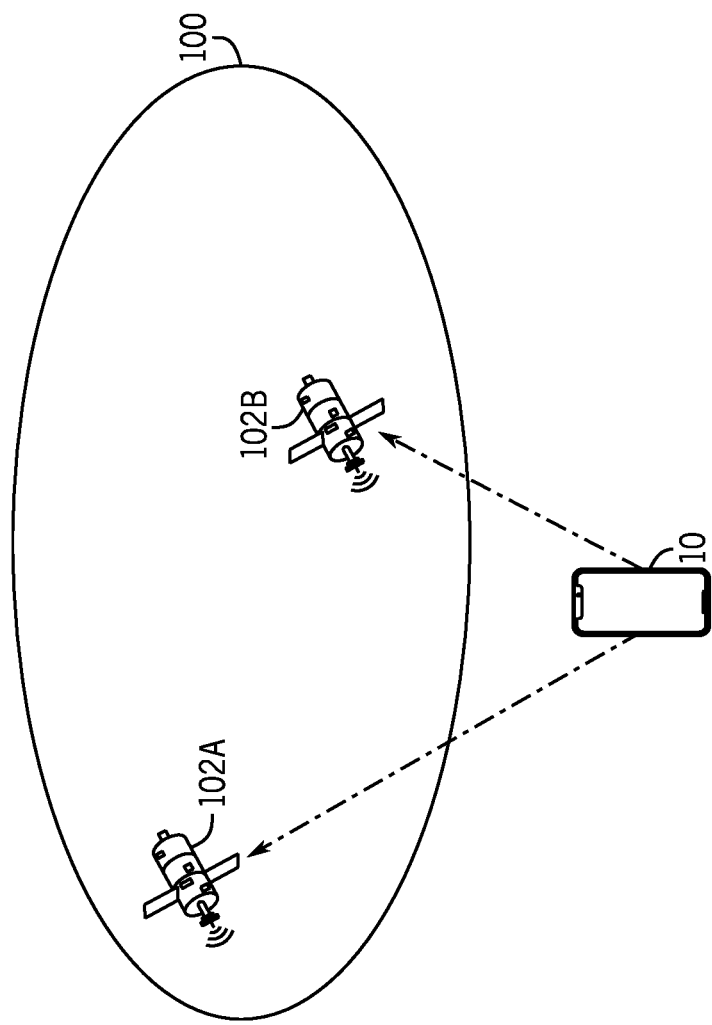
FIG. 4 is a schematic diagram of a communication system including the user equipment of FIG. 1 communicatively coupled to a non-terrestrial network supported by satellites, according to embodiments of the present disclosure.

FIG. 4 is a schematic diagram of the user equipment 10 communicating (e.g., transmitting wireless signals, receiving wireless signals) with a non-terrestrial network (NTN) 100 supported by a first communication node 102A and a second communication node 102B, according to embodiments of the present disclosure. The NTN 100 may include a global navigation satellite system (GNSS) network, a non-terrestrial network, or any other suitable wireless communication network. Moreover, the NTN 100 is provided as an example, and in additional or alternative embodiments, the NTN 100 may instead be a terrestrial network, such as a radio access network (RAN), a WLAN, a PAN, and so on. The NTN 100 may include multiple communication nodes 102 communicatively coupled together. The communication nodes 102 may include any suitable electronic device, such as non-terrestrial base stations, satellites, high-altitude platform stations, airborne base stations, space borne base stations, or any other suitable nonstationary or stationary communication devices, communicatively coupled to the user equipment. In additional or alternative embodiments, the communication node 102 may include base stations, such as Next Generation NodeB (gNodeB or gNB) base stations and may provide 5G/NR coverage to the user equipment 10, Evolved NodeB (eNodeB) base stations and may provide 4G/LTE coverage, to the user equipment 10, and so on.

FIGS. 5A-F are meter bar graphs of transmission power 130 of the user equipment 10 operating with different power classes and one or more power additions. As discussed herein, the 3GPP standards defines two power classes for the user equipment 10 when operating in frequency domain duplex (FDD) bands of terrestrial networks without specifying time-domain restrictions on one or more uplink allocations. In particular, the 3GPP standards defines power classes based on a maximum transmission power over a New Radio (NR) channel bandwidth. For example, Power Class 2 (PC2) may be defined by a maximum transmission power equivalent to +26 dBm and Power Class 3 (PC3) be defined by a transmission power equivalent to +23 dBm. Additionally, the maximum transmission power may be adjusted by a tolerance value of ±2 dBm. In certain instances, the user equipment 10 may transmit (e.g., the transmitter 52 may transmit) data over longer (e.g., farther) distances when enabled with a high power class (e.g., PC2) in comparison to a low power class (e.g., PC3), which may improve transmission range and/or reliability. For example, the user equipment 10 may transmit using high power (e.g., transmission power greater than +23 dBm) to increase probability of a single-shot transmission being successfully decoded by the NTN 100, thereby improving communication with the NTN 100. As such, transmissions between the user equipment 10 and the NTN may be improved.

Figure 5C:
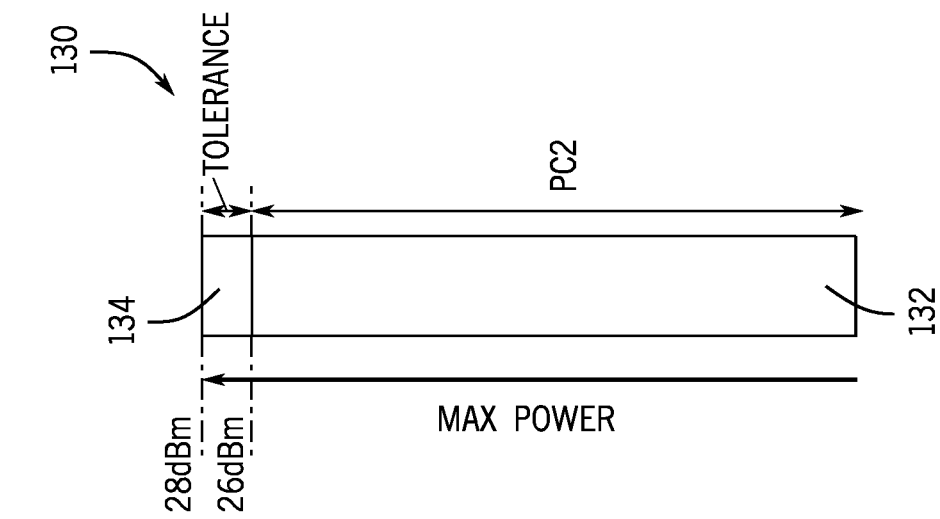
FIG. 5C is a meter bar graph of transmission power of the user equipment of FIG. 1 at a maximum transmission power with Power Class 2 (PC2) and a tolerance value, according to embodiments of the present disclosure.
Figure 5B:
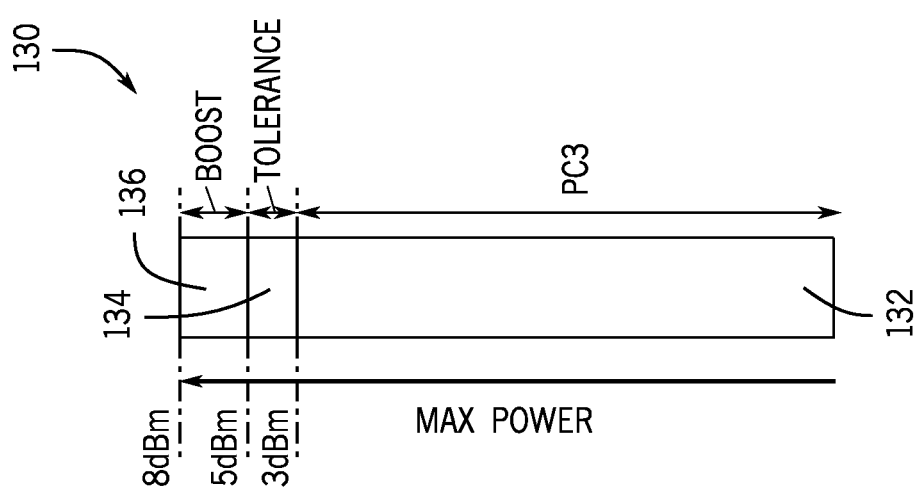
FIG. 5B is a meter bar graph of transmission power for the user equipment of FIG. 1 at a maximum transmission power with PC3, a tolerance, and a power boost, according to embodiments of the present disclosure.
Figure 5A:
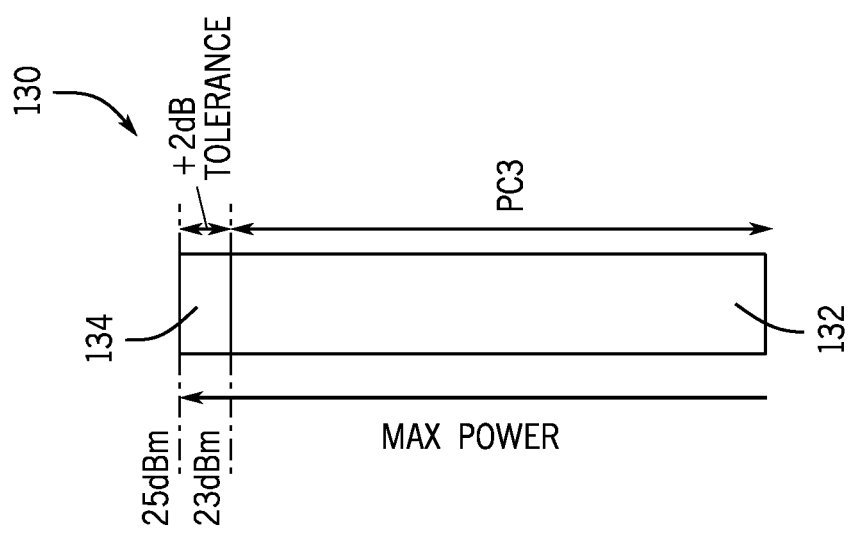
FIG. 5A is a meter bar graph of transmission power of the user equipment of FIG. 1 at a maximum transmission power with Power Class 3 (PC3) and a tolerance value, according to embodiments of the present disclosure.

With the foregoing in mind, FIG. 5A is a meter bar graph of transmission power 130 of the user equipment 10 at a maximum transmission power 132 with PC3 and a tolerance 134, according to embodiments of the present disclosure. The transmission power 130 of the user equipment 10 may be equivalent to a maximum transmission power 132 of an enabled power class and one or more additions (e.g., tolerance value, power booster). For example, the user equipment 10 may operate with PC3. The maximum transmission power 132 defined by PC3 may be +23 dBm, which may be include a tolerance 134 of 2 dBm (which may be signified as ±2 dBm). As such, the transmission power 130 of the user equipment 10 when operating with the PC3 may be +23 dBm±2 dBm. In certain instances, the tolerance 134 may be ±0.1 dBm, ±0.5 dBm, ±1 dBm, ±1.5 dBm, within ±2 dBm, exceeding ±2 dBm, and so on.

FIG. 5B is a meter bar graph of transmission power 130 of the user equipment 10 at a maximum transmission power 132 with PC3, a tolerance 134, and a power boost 136, according to embodiments of the present disclosure. The power boost 136 may be an increase in transmission power above the maximum transmission power 132 of the enabled PC, the tolerance 134, or both. As discussed herein, the maximum transmission power 132 defined by PC3 and the tolerance 134 may be +23 dBm±2 dBm. As illustrated, the power boost 136 may be +3 dBm, however the power boost 136 may be any suitable value, such as +1 dBm, +2 dBm, +4 dBm or less, +4 dBm or greater, and so on. As such, the transmission power 130 of the user equipment 10 when operating with PC3, the tolerance 134, and the power boost 136 may be +28 dBm.

FIG. 5C is a meter bar graph of transmission power 130 of the user equipment 10 at a maximum transmission power 132 with PC2 and the tolerance 134, according to embodiments of the present disclosure. The maximum transmission power 132 defined by PC2 may be +26 dBm and the tolerance 134 may be ±2 dBm. As such, the transmission power 130 of the user equipment 10 may be +28 dBm when operating with the PC2.

Figure 5F:
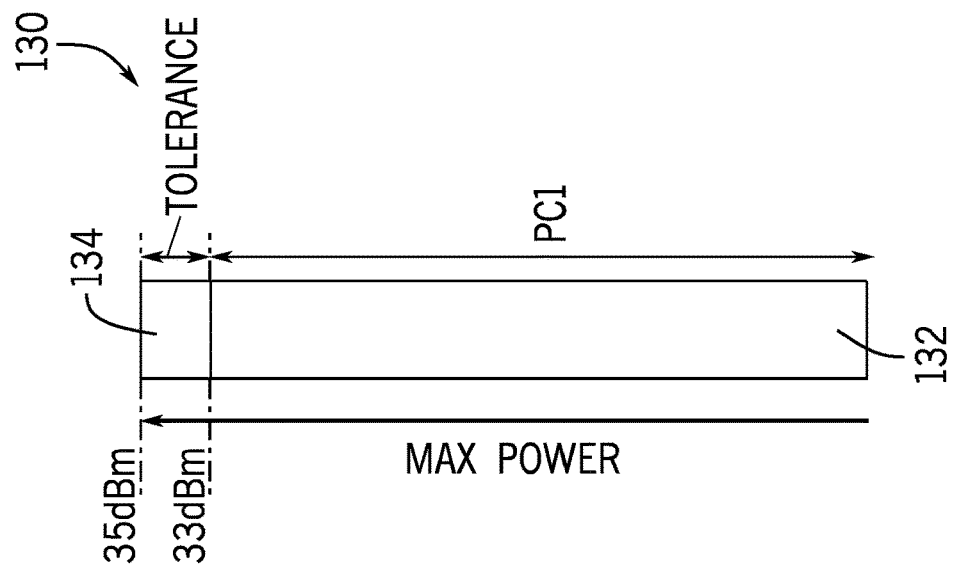
FIG. 5F is a meter bar graph of transmission power of the user equipment of FIG. 1 at a maximum transmission power with Power Class 1 (PC1) and a tolerance value, according to embodiments of the present disclosure.
Figure 5E:
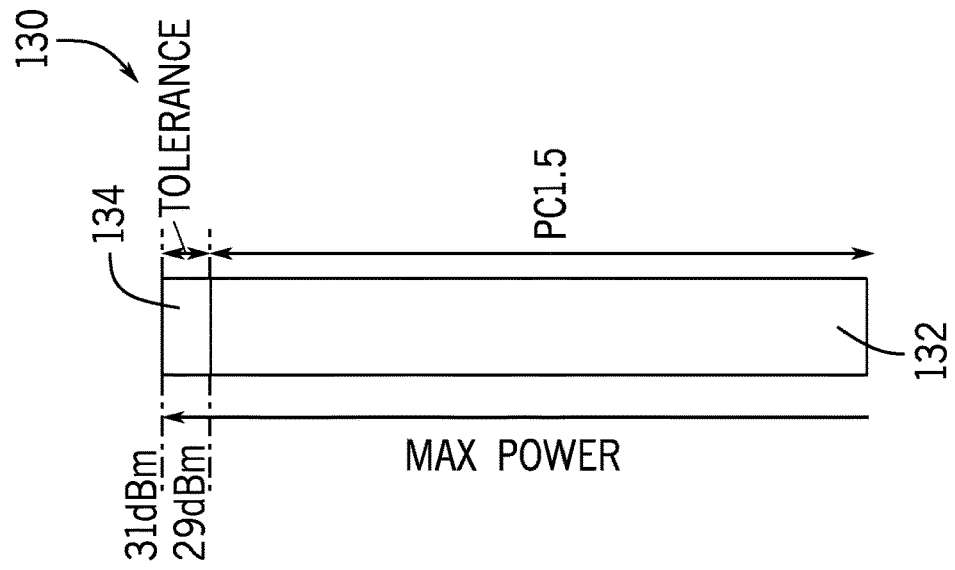
FIG. 5E is a meter bar graph of transmission power of the user equipment of FIG. 1 at a maximum transmission power with Power Class 1.5 (PC1.5) and a tolerance value, according to embodiments of the present disclosure.
Figure 5D:
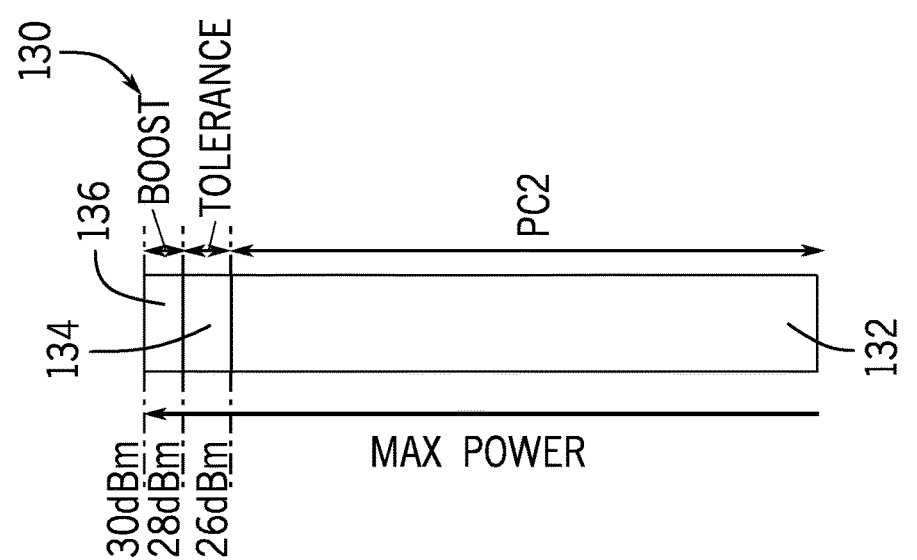
FIG. 5D is a meter bar graph of transmission power of the user equipment of FIG. 1 at a maximum transmission power with PC2, a tolerance value, and a power boost, according to embodiments of the present disclosure.

FIG. 5D is a meter bar graph of transmission power 130 of the user equipment 10 at a maximum transmission power 132 with PC2, a tolerance 134, and a power boost 136, according to embodiments of the present disclosure. As illustrated, the power boost 136 may be an increase in transmission power by +2 dBm. However, the power boost 136 may be any suitable increase in transmission power. Indeed, the transmission power 130 of the user equipment 10 may be the maximum transmission power 132 of PC2, the tolerance 134, and the power boost 136, or +30 dBm.

FIG. 5E is a meter bar graph of transmission power 130 of the user equipment 10 at a maximum transmission power 132 with PC1.5 and a tolerance 134, according to embodiments of the present disclosure. The maximum transmission power 132 defined by PC1.5 and the tolerance 134 may be +29 dBm±2 dBm. As such, the transmission power 130 of the user equipment 10 may be +31 dBm. By way of example, PC1.5 may be implemented through dual transmission architecture (e.g., concurrent transmission using two or more antennas 55) and specified for time division duplex (TDD) bands, such as band n41, n77, n78, n79, and so on.

FIG. 5F is a meter bar graph of transmission power 130 of the user equipment 10 at a maximum transmission power 132 with PC1 and a tolerance 134, according to embodiments of the present disclosure. The maximum transmission power 132 defined by PC1 and the tolerance 134 may be +31 dB±2 dBm. As such, the transmission power 130 of the user equipment 10 may be +33 dBm. For example, PC1 may be specified for LTE bands (e.g., 3, 14, 20, 28, 31, 72, 87, 88) and NR bands (e.g., n14, n71, n85). It should be noted that PC1 may be enabled for commercial devices (e.g., not for smartphone form factors).

Figure 6:
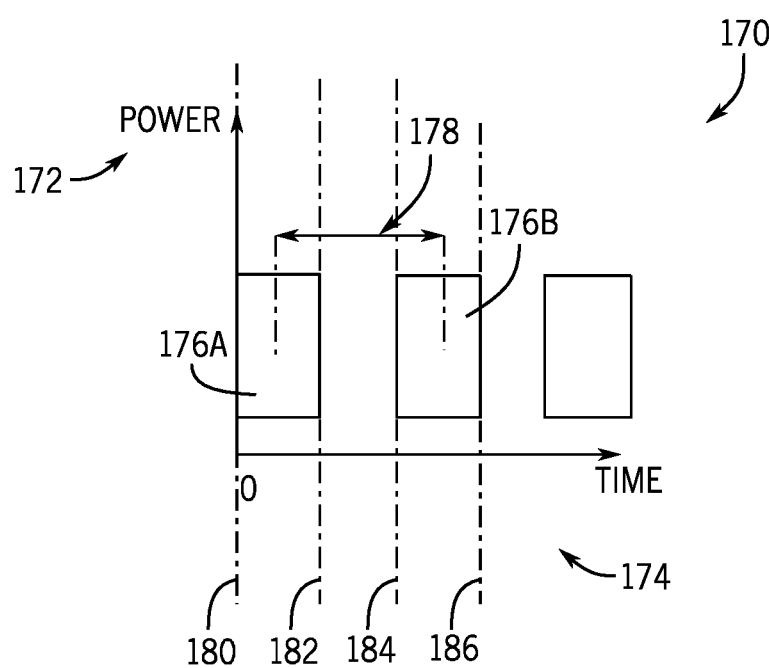
FIG. 6 is a timing diagram of transmission power of the user equipment of FIG. 1 during one or more transmissions over time, according to embodiments of the present disclosure.

FIG. 6 is a timing diagram 170 of transmission power 172 of the user equipment 10 during one or more transmissions over time 174, according to embodiments of the present disclosure. For example, the user equipment 10 may transmit data 176 over a time period 178 using high power based on uplink allocation frequency to the communication node 102 and/or the NTN 100. As used herein, the user equipment 10 may transmit may refer to the transmitter 52 transmitting the data and high power may refer to a transmission power of the user equipment 10 greater than a threshold defined by 3GPP NTN specifications, which may be the maximum transmission power of PC3 or +23 dBm±2 dBm. Accordingly, high power may be any suitable value greater than +23 dBm±2 dBm (e.g., including that specified by PC2, PC1.5, and so on).

Returning to the timing diagram 170, the user equipment 10 may transmit first data 176A using high power at a first time 180, stop transmitting data at a second time 182, and transmit second data 176B using high power at third time 184, and stop transmitting data at a fourth time 186. The time period 178 may include a start time between the first time 180 and the second time 182 and an end time between the third time 184 and fourth time 186. During the time period 178, the user equipment 10 may monitor and/or store an indication of the transmission power 172 used to transmit the first data 176A and the second data 176B. For example, the user equipment 10 may store indications of the transmission power in the memory 14.

The user equipment 10 may determine if an average transmission power over the time period 178 exceeds a threshold. In an instance, the time period 178 may be defined by regulations. For example, the SAR regulation defines a time period to be 100 seconds for frequency bands below 3 GHZ, 60 seconds for frequency bands between 3-6 GHZ, and/or 360 seconds (e.g., for certain countries). In another example, the time period 178 may be any amount of time below the time period defined by the SAR regulation. If the time period 178 is below the SAR regulation and each average transmission power during the time period is below the threshold, then an aggregated transmission power during the SAR regulation may also be below the threshold. The threshold may include a maximum transmission power defined by the regulations. For example, the user equipment 10 may determine the average transmission power based on the transmission power 172 of the first data 176A over the first time period, zero power over the second period, and the transmission power 172 of the second data 176B over the third time period. The transmissions may be spaced in the time domain such that the average transmission power may not exceed the threshold. As such, the user equipment 10 may transmit using high power and conform to the regulations.

Figure 7:
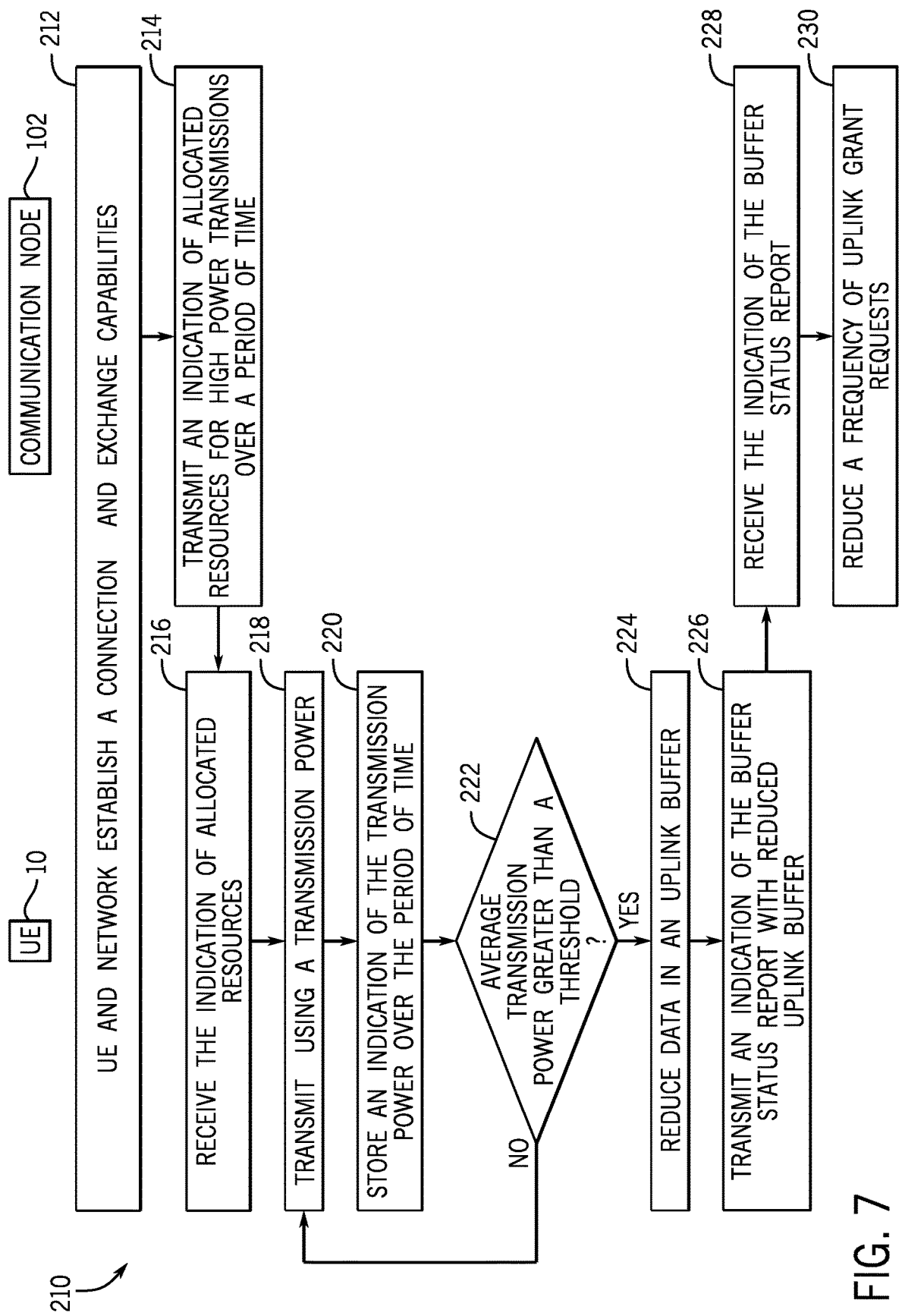
FIG. 7 is a flowchart of a method to transmit with high power by reducing uplink allocation frequency, according to embodiments of the present disclosure.

With the foregoing in mind, FIG. 7 is a flowchart of a method 210 to transmit with high power by reducing uplink allocation frequency, according to embodiments of the present disclosure. Any suitable device (e.g., a controller) that may control components of the user equipment 10, such as the processor 12, may perform the method 210. In some embodiments, the method 210 may be implemented by executing instructions stored in a tangible, non-transitory, computer-readable medium, such as the memory 14 or storage 16, using the processor 12. For example, the method 210 may be performed at least in part by one or more software components, such as an operating system of the user equipment 10, one or more software applications of the user equipment 10, and the like. While the method 210 is described using steps in a specific sequence, it should be understood that the present disclosure contemplates that the described steps may be performed in different sequences than the sequence illustrated, and certain described steps may be skipped or not performed altogether.

In process block 212, the user equipment 10 and the communication node 102 establish a connection and exchange capabilities. To connect to the communication node 102, the user equipment 10 may scan to detect communication nodes 102 of the NTN 100. In particular, the user equipment 10 may detect a first communication node 102A by receiving radio frequency (RF) signal when the user equipment 10 enters coverage area of the first communication node 102A (e.g., a geographical region for which the communication node provides network coverage). The user equipment 10 may synchronize to the first communication node 102A by aligning its signal with the RF signal of the first communication node 102A. Further, the first communication node 102A may broadcast or transmit system information (e.g., downlink data) indicative of one or more frequency bands, and/or a power class supported by the communication node 102. The system information may also include timing specifications, power specifications, Global Positioning System (GPS) or Global Navigation Satellite System (GNSS) coordinates, and/or other suitable information to enable the user equipment to establish the connection with the first communication node 102A. The user equipment 10 may receive the system information to establish a communication link (e.g., connection) with the first communication node 102A and the NTN 100. For example, data (e.g., user data) may be sent over a channel of the communication link that is allocated to the user equipment 10 by the first communication node 102A or the NTN 100. Moreover, the user equipment 10 may monitor the communication link for an indication of transmission power (e.g., power class) used to transmit the data. In other words, the first communication node 102A may transmit or receive user data to or from the user equipment 10 over the channel allocated to the user equipment 10 or the established communication link. In certain instances, the first communication node 102A may transmit an indication including uplink allocation frequency, scheduled uplink grants, and so on. Additionally or alternatively, the user equipment 10 may transmit an indication of its capabilities (e.g., ability to transmit using high power) to the first communication node 102A.

In process block 214, the communication node 102 transmits an indication of the allocated resources for high power transmissions over a period of time. For example, the communication node 102 may transmit an indication of a supported power class and/or a transmission power. In another example, the communication node 102 may transmit an indication of uplink allocation frequency that may be allocated to the user equipment 10 for subsequent transmissions over the period of time (e.g., the time period 178 described with respect to FIG. 6). The uplink allocation frequency may be a number of times the user equipment 10 may transmit data over the period of time. In certain instances, the communication node 102 may determine the uplink allocation frequency based on a buffer status report (BSR) transmitted by the user equipment 10.

In process block 216, the user equipment 10 receives the indication of allocated resources from the communication node 102. The user equipment 10 may receive via the receiver 54 the indication of the uplink allocation frequency, the power class, a transmission power, and the like from the communication node 102. For example, the user equipment 10 may receive via the receiver 54 an indication that PC2 may be a power class supported by the communication node 102 and to be used to transmit signals via the antennas 55. In another example, the user equipment 10 may receive via the receiver 54 an indication that PC1.5 may be a power class supported by the communication node 102 and to be used to transmit signals via the antennas 55 data.

In process block 218, the user equipment 10 transmits using a transmission power. The transmission power may be associated with the power class supported by the communication node 102. For example, the user equipment 10 may determine that PC1.5 may be supported by the communication node 102 and transmit using the maximum transmission power associated with PC1.5. In another example, the user equipment 10 may transmit data using high power over a first period of time, stop transmissions over a second period of time, and resume transmissions over a third period of time using high power. Still in another example, the user equipment 10 may transmit using high power based on the uplink allocation frequency.

In process block 220, the user equipment 10 stores an indication of the transmission power over the period of time. For example, the user equipment 10 may store the high power value used to transmit the data (e.g., first data 176A, second data 176B) in the memory 14. In another example, the user equipment 10 may store an indication of the power class used to transmit the data. Still in another example, the user equipment 10 may store an indication of the transmission power used to transmit the data over time.

In determination block 222, the user equipment 10 determines if an average transmission power is greater than a threshold. As discussed herein, the threshold may include the maximum transmission power of PC3. For example, the user equipment 10 may average the transmission power used to transmit data over the time period 178. As described with respect to FIG. 6, the user equipment 10 may average the power used to transmit the first data 176A and the power used to transmit the second data 176B over the time period 178. Since the user equipment 10 may stop transmissions for an amount of time during the time period, the average transmission power over the time period of may be less than the power used to transmit the first data 176A and/or the second data 176B. The user equipment 10 may then compare the average transmission power to the threshold.

If the average transmission power is not greater than the threshold, then the method 210 returns to process block 218 and the user equipment 10 transmits using the maximum transmission power. For example, the user equipment 10 may perform transmissions using the transmission power of PC3, which may not be above the threshold. As such, the user equipment 10 may continue operating with PC3. In another example, the user equipment 10 may transmit using PC1.5, but stop transmissions for an amount of time, which may reduce the average transmission power to be below the threshold. As such, the user equipment 10 may transmit using PC1.5. The method 210 may then proceed to process block 220 and to the determination block 222.

If the average transmission power is greater than the threshold, then in process block 224, the user equipment 10 reduces (e.g., adjusts) data in an uplink buffer. The uplink buffer may include the data to be transmitted to the communication node 102 and/or the NTN 100. Based on the uplink buffer, the user equipment 10 may generate the BSR that includes an amount of data for transmission. The user equipment 10 may transmit the BSR and a scheduling request to the communication node 102 to adjust the uplink allocation frequency for subsequent transmissions. For example, the communication node 102 may increase or decrease an uplink allocation frequency allocated to the user equipment 10 based on the BSR. The uplink allocation frequency may include a number of scheduled uplink grants, a timing of the scheduled uplink grants, a time period for transmission, and the like. For example, the BSR may indicate that the buffer may be full or almost full and the communication node 102 may increase uplink allocation frequency based on the BSR. An increase in uplink allocation frequency to the user equipment 10 may allow the user equipment 10 to increase transmitting frequency and reduce the uplink buffer. In another example, the BSR may indicate that the uplink buffer may not be full (e.g., below a threshold percentage, half-full, less than 100% full or less, less than 80% or less, less than 50% full or less, less than 10% or less, close to empty, and so on). In certain instances, the user equipment 10 may reduce the data to be transmitted in the uplink buffer to reduce the frequency of uplink grant requests. For example, the user equipment 10 may determine a priority of the data and remove data from the uplink buffer that may be below a threshold to reduce the uplink buffer. As a result, the communication node 102 may decrease uplink allocation frequency based on the BSR. In this way, the user equipment 10 may adjust the uplink buffer and the user equipment 10 may generate the BSR based on the adjusted uplink buffer.

In process block 226, the user equipment 10 transmits an indication of the BSR with the reduced uplink buffer. For example, the user equipment 10 may transmit via the antenna 55 the adjusted BSR to the communication node 102. In process block 228, the communication node 102 receives the indication of the BSR from the user equipment 10. For example, the communication node 102 may receive the adjusted BSR via one or more receivers. The communication node 102 may determine a low uplink buffer (e.g., below a threshold percentage) based on the adjusted BSR.

In process block 230, the communication node 102 reduces a frequency of uplink grant requests. Based on the adjusted BSR, the communication node 102 may decrease the uplink allocation frequency. For example, the communication node 102 may decrease a number of scheduled uplink grants allocated to the user equipment 10. In another example, the communication node 102 may increase an amount of time between each scheduled uplink grant to a frequency of the scheduled uplink grants allocated to the user equipment 10. By decreasing the number of scheduled uplink grants, the user equipment 10 may transmit less data over the time period 178, which may decrease the average transmission power used during transmitting over the time period 178. In this way, the user equipment 10 may operate using high power without applying a power back-off. As such, the average transmission power over the time period may be below the threshold.

Figure 8:
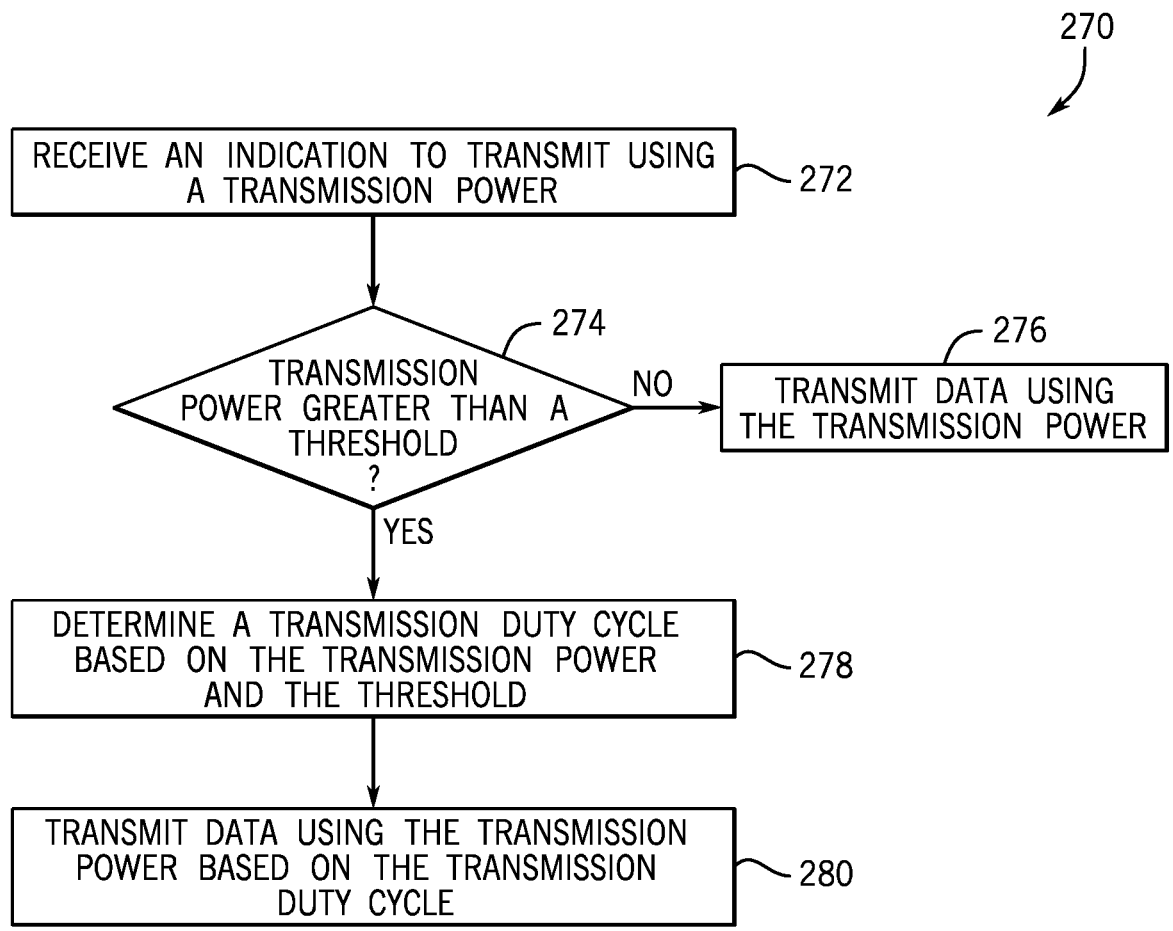
FIG. 8 is a flowchart of a method to transmit with high power by determining a transmission duty cycle based on a given high power value, according to embodiments of the present disclosure.

FIG. 8 illustrates a flowchart of a method 270 to transmit with high power by determining a transmission duty cycle based on a given high power value, according to embodiments of the present disclosure. In certain instances, the connection between the user equipment 10 and the communication node 102 may be limited due to low transmission power and/or coupling loss during transmission. In certain instances, the user equipment 10 may transmit using a high or maximum transmission power to improve the connection. As discussed herein, the user equipment 10 may transmit using high power, such as using PC1, PC1.5, and/or PC2 with or without a power boost, which may be above the threshold. To maintain transmissions using high power, the transmission may be intermittently turned on or off (e.g., duty cycled) to be within a threshold. For example, the transmission duty cycle may be determined based on Equation 1, below:

$$\text{Transmission Duty Cycle} = 10^{\wedge}(-(P_{max}\ (\text{dBm}) - \text{threshold})/10) * 100\%$$

(Equation 1)

For example, the $P_{max}$ may be the maximum transmission power of the user equipment 10 (e.g., high power) and the threshold may be a maximum transmission power defined by regulations. As discussed herein, the threshold may be +23 dBm or the maximum transmission power of PC3.

With the foregoing in mind, the user equipment 10 receives an indication to transmit using a transmission power, in process block 272. For example, the user equipment 10 may receive the indication via the receiver 54 to transmit at a power supported by the communication node 102 and/or the NTN 100. The indication may include PC1, PC1.5, PC2, PC3, and the like. For example, the user equipment 10 may determine that PC3 may be supported by the communication node 102 and determine the transmission power may be +23 dBm. In another example, the user equipment 10 may determine transmission using PC1, PC1.5, and/or PC2 may be supported by the communication node 102 and determine the transmission power associated with the power class.

In determination block 274, the user equipment 10 determines if the transmission power is greater than a threshold. For example, the threshold may be defined by regulations, such as the 3GPP NTN specifications defining NTN communications to a maximum transmission power of PC3. However, the threshold may be any suitable transmission power value constraining the user equipment 10 during transmission. In certain instances, the user equipment 10 may transmit using high power, which may be above the threshold. As such, the user equipment 10 may compare the transmission power to the threshold prior to transmitting to transmit in accordance to the regulations. For example, the user equipment 10 may transmit using PC1.5 to improve transmission range and/or reliability with the communication node 102.

If the transmission power is not greater than a threshold, then in process block 276, the user equipment 10 transmits data using the transmission power. For example, the user equipment 10 may transmit using PC3, which may include a maximum transmission power equal to the threshold. As such, the maximum transmission power of the user equipment 10 may equal to or below the threshold. The user equipment 10 may transmit using PC3 and the maximum transmission power may be within the regulations.

If the transmission power is greater than the threshold, then in process block 278, the user equipment 10 determines a transmission duty cycle based on the transmission power and the threshold. For example, the user equipment 10 may transmit using PC2, which may include a transmission power above the threshold. To decrease the average transmission power to meet the threshold, the user equipment 10 may transmit based on a transmission duty cycle, which may be determined based on Equation 1 above. The transmission power of the user equipment 10 may be +26 dBm. As such, the transmission duty cycle may be equivalent to $10^{\wedge}(-(26-23)/10)*100\%$, or 50%.

In process block 280, the user equipment 10 transmits data using the transmission power based on the transmission duty cycle. For example, the user equipment 10 may transmit at high power for 50% of a scheduled uplink grant when using PC2. In another example, the user equipment 10 may transmit data over a first time period and may not transmit data over a second time period, wherein the first time period equals the second time period, thereby transmitting at the 50% transmission duty cycle. In this way, the average transmission power of the user equipment over a time period may be below the threshold and the user equipment 10 may use high power. As such, the user equipment 10 may transmit using high power without exceeding the threshold.

Figure 9:
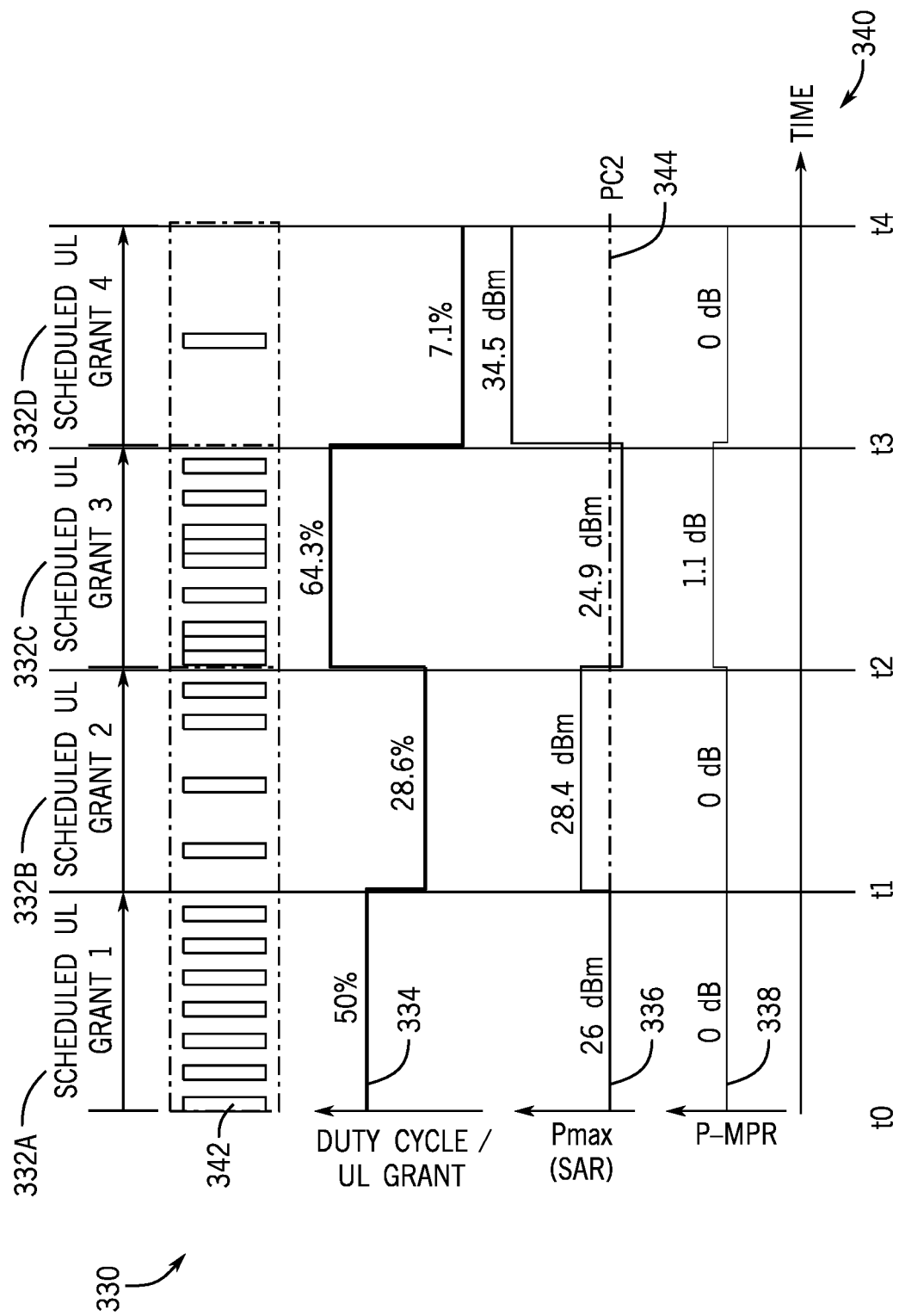
FIG. 9 is a timing diagram of the user equipment of FIG. 1 determining a transmission duty cycle to transmit with high power and maintaining the high power by applying a power back-off, according to embodiments of the present disclosure.
Figure 10:
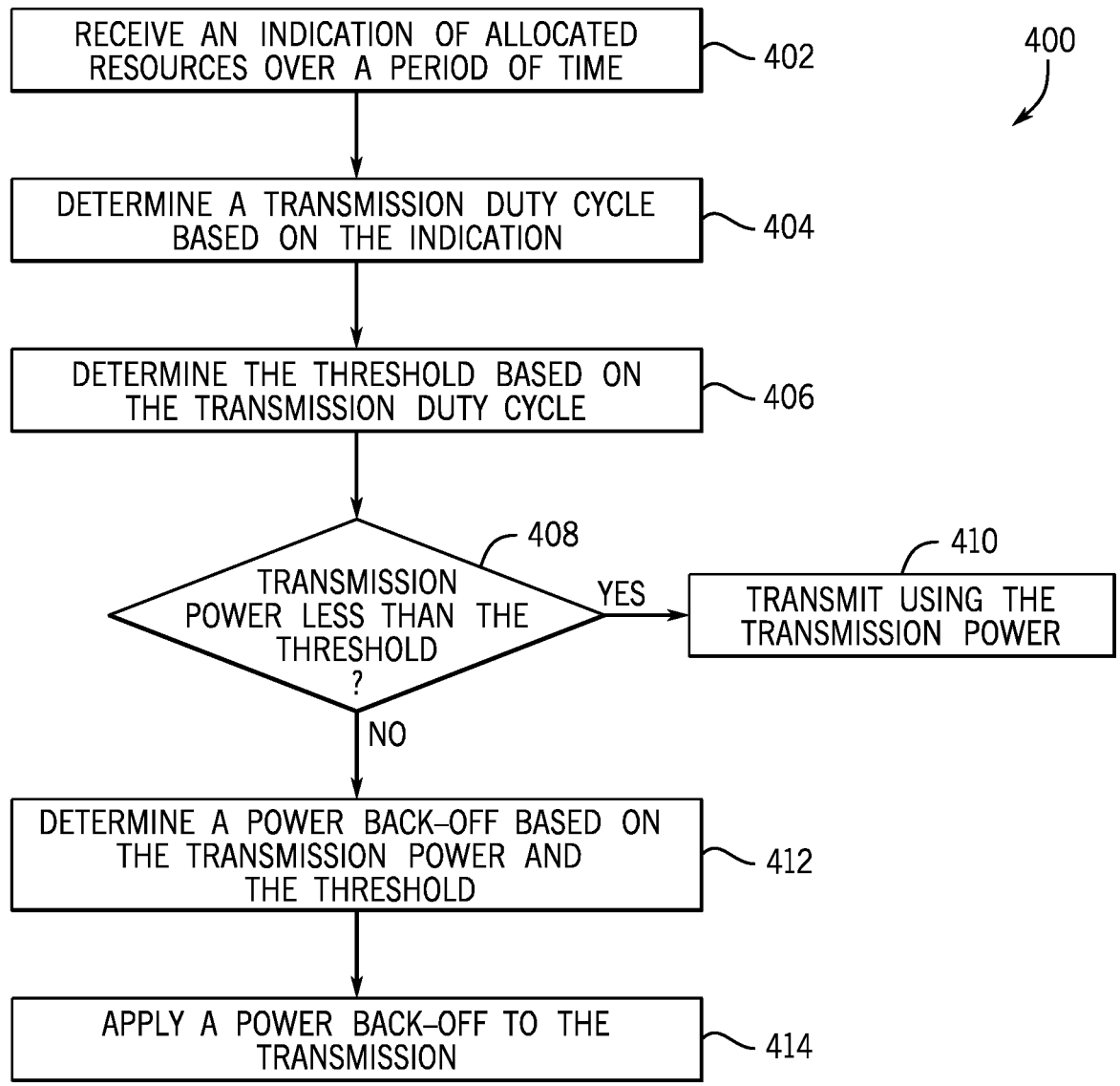
FIG. 10 is a flowchart of a method to transmit with high power by determining a transmission power based on a given duty cycle, according to embodiments of the present disclosure.

FIG. 9 is a timing diagram 330 of the user equipment 10 determining a transmission duty cycle to transmit with high power and maintaining the high power by applying a power back-off, according to embodiments of the present disclosure. For example, the timing diagram 330 may include one or more scheduled uplink grants 332 received by the user equipment 10, a transmission duty cycle 334 determined by the user equipment 10 for each scheduled uplink grant 332, a threshold 336 based on the transmission duty cycle 334, and an amount of power back-off 338 applied by the user equipment 10 based on the transmission duty cycle 334 over a time period 340. FIG. 10 illustrates a flowchart of a method 380 to transmit with high power by determining a transmission power based on a given duty cycle, according to embodiments of the present disclosure. For sake of brevity and clarity, FIGS. 9 and 10 will be discussed together below.

In process block 402, the user equipment 10 receives an indication of allocated resources over a period of time. For example, the user equipment 10 may receive the indication via the receiver 54 from the communication node 102. The allocated resources may include one or more scheduled uplink grants 332, a maximum transmission power (e.g., supported by the communication node 102), an uplink allocation frequency, and the like. For example, the user equipment 10 may receive an indication to transmit using PC2. In certain instances, the user equipment 10 may receive one or more scheduled uplink grants 332 over the time period 340. For example, a first scheduled uplink grant 332A may start at time t=0 and end at time t=t1, a second scheduled uplink grant 332B may start at time t=t1 and end at time t=t2, a third scheduled uplink grant 332C may start at time t=t2 and end at time t=t3, and/or a fourth scheduled uplink grant 332D may start at time t=t3 and end at time t=t4. Within each scheduled uplink grant 332, the user equipment 10 may receive an indication of a time slot 342 (e.g., transmission slot) for transmitting the data. For example, the first scheduled uplink grant 332A may include seven time slots 342 that may be allocated to the user equipment 10 for transmission. In another example, the second scheduled uplink grant 332B may include four time slots 342, the third scheduled uplink grant 332C may include nine time slots 342, and/or the fourth scheduled uplink grant 332D may include one time slot 342.

In process block 404, the user equipment 10 determines a transmission duty cycle 334 based on the indication. The user equipment 10 may determine the transmission duty cycle 334 for each scheduling uplink grant 332 based on the number of time slots 342. In an instance, the transmission duty cycle may be determined based on comparison between the number of times slots within the scheduled uplink grant 332 and a maximum number of slots allowed within the scheduled uplink grant 332. By way of example, the scheduled uplink grant 332 may include a maximum of fourteen time slots. The first scheduled uplink grant 332A may include a transmission duty cycle 334 of 50%, which may be determined by seven time slots 342 divided by a total of fourteen time slots. In another example, the second scheduled uplink grant 332B may include four time slots 342, as such the transmission duty cycle 334 may be 28.6%. Still in another example, the third scheduled uplink grant 332C may include nine time slots 342, as such the transmission duty cycle 334 may be 64.3%. The fourth scheduled uplink grant 332D may include one time slot 342, as such a transmission duty cycle 334 of 7.1%.

In process block 406, the user equipment 10 determines the threshold 336 based on the transmission duty cycle 334. The threshold 336 may include a threshold transmission power value that may comply the regulations. For example, the threshold 336 may be a transmission power of the user equipment 10 that may be at or below a threshold defined by regulations (e.g., SAR regulations) based on the transmission duty cycle 334. For example, during the fourth scheduled uplink grant 332D, the user equipment 10 may transmit data over one time slot 342. Since the user equipment 10 may transmit data only once during the fourth scheduled uplink grant 332D, the user equipment 10 may transmit using high power without exceeding the threshold (e.g., as defined by SAR regulations). To determine the threshold 336 ($P_{max}$), the user equipment 10 may make the determination based on Equation 2 below.

$$\text{Threshold}(P_{max}) = 23 - 10 * \log_{10}(\text{Transmission Duty Cycle}) \text{ (dBm)} \qquad \text{(Equation 2)}$$

For example, the first scheduled uplink grant 332A may include the transmission duty cycle 334 of 50%. The threshold 336 may be determined by $23-10*\log_{10}(0.50)=26$ dBm. That is, the user equipment 10 may operate at the threshold 336 (e.g., +26 dBm) during the first scheduled uplink grant 332A without exceeding the regulations. In another example, the threshold 336 of the second scheduled uplink grant 332B may be determined by $23-10*\log_{10}(0.286)=28.4$ dBm. Still in another example, the transmission duty cycle 334 of the third scheduled uplink grant 332C may be 64.3% and the threshold 336 may be +24.9 dBm. In yet another example, the transmission duty cycle 334 of the fourth scheduled uplink grant 332D may be 7.1% and the threshold 336 may be +34.5 dBm.

In determination block 408, the user equipment 10 determines if a transmission power is greater than the threshold 336. For example, the user equipment 10 may receive an indication to operate using PC1, PC1.5, PC2, and/or PC3. If the transmission power of an enabled power class is greater than the threshold 336, then a power back-off may be applied to reduce the transmission power of the user equipment 10. For example, the transmission power of PC2 may be illustrated by line 344. The user equipment 10 may compare the determined threshold 336 of each scheduled uplink grant 332 to the transmission power the enabled power class to determine whether to apply a power back-off.

If the transmission power is less than the threshold 336, then in process block 410 the user equipment 10 transmits using the transmission power over the period of time. For example, the user equipment 10 may transmit using PC2 during the first scheduled uplink grant 332A. Since the transmission power of PC2 is less than or equal to the threshold 336, the user equipment 10 may operate using PC2. In another example, the transmission power of PC2 may be less than the threshold 336 of the second scheduled uplink grant 332B. As such, the user equipment 10 may use PC2 to transmit data during the second scheduled uplink grant 332B. Still in another example, the user equipment 10 may determine the threshold 336 of the fourth scheduled uplink grant 332D is greater than the transmission power of PC2. As such, the user equipment 10 may operate using PC2 (e.g., high power) during the first scheduled uplink grant 332A, the second scheduled uplink grant 332B, and/or fourth scheduled uplink grant 332D without exceeding the threshold defined by the regulations.

If the transmission power is greater than the threshold 336, then in process block 412, the user equipment determines a power back-off 338 based on the transmission power and threshold 336. For example, the power back-off 338 may be determined based on Equation 3, below.

$$\text{Power Back-Off} = P_{PowerClass} - P_{max} \text{ (dB)} \qquad \text{(Equation 3)}$$

The $P_{PowerClass}$ may be the transmission power of the user equipment 10 or the transmission power of the enabled Power Class. For example, the user equipment 10 may operate using PC2 and the $P_{PowerClass}$ may be the transmission power of PC2 or +26 dBm. As illustrated, a power back-off may be applied during the third scheduled uplink grant 332C. For example, the threshold 336 of the third scheduled uplink grant 332C may be +24.9 dBm, which is less than the transmission power of PC2. As such, the user equipment 10 may reduce the transmission power to comply with the regulations. The user equipment 10 may determine the power back-off 338 based on Equation 3. The power back-off 338 may be +26 dBm-24.9 dBm, or 1.1 dB. In another example, the user equipment 10 may operate using PC2 and determine a threshold 336 of +24.5 dBm based on a scheduled uplink grant 332. Since the threshold 336 of the scheduled uplink grant 332 may be less than the transmission power of PC2, the user equipment 10 may determine a power back-off 338 based on Equation 3. The power back-off 338 may be +26 dBm-24.5 dBm, or 1.5 dBm.

In process block 414, the user equipment 10 applies the power back-off to the transmission. The power back-off 338 may be small (e.g., much less than) the transmission power. As such, the user equipment 10 may apply the power back-off via a digital baseband in the digital domain. In certain instances, the method 400 may be performed prior to transmitting at the beginning of each scheduled uplink grant 332. In other instances, the user equipment 10 may receive an indication of multiple scheduled uplink grants 332 and determine the transmission duty cycle 334, the threshold 336 for each transmission duty cycle 334, and/or the power back-off 338 prior to transmitting. As such, the power back-off 338 may be determined for each scheduled uplink grant 332 prior to transmitting and the user equipment 10 may transmit in accordance to the regulations.

The method 400 may be performed by any suitable device (e.g., a controller) that may control components of the user equipment 10, such as the processor 12. In some embodiments, the method 400 may be implemented by executing instructions stored in a tangible, non-transitory, computer-readable medium, such as the memory 14 or storage 16, using the processor 12. For example, the method 400 may be performed at least in part by one or more software components, such as an operating system of the user equipment 10, one or more software applications of the user equipment 10, and the like. While the method 400 is described using steps in a specific sequence, it should be understood that the present disclosure contemplates that the described steps may be performed in different sequences than the sequence illustrated, and certain described steps may be skipped or not performed altogether.

Figure 11:
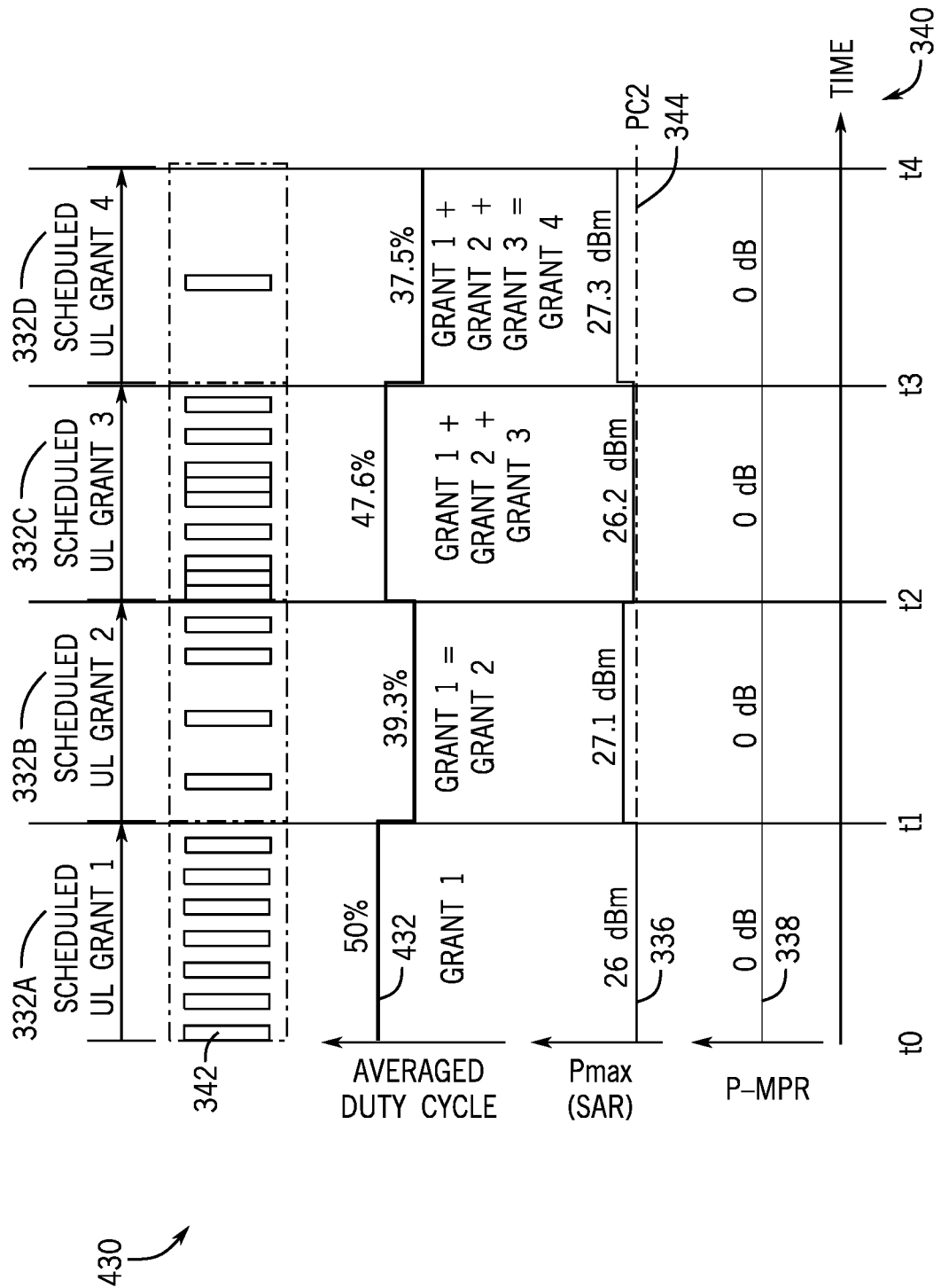
FIG. 11 is a timing diagram of the user equipment FIG. 1 determining an average transmission duty cycle to transmit with high power over a period of time and maintaining high power, according to embodiments of the present disclosure.
Figure 12:
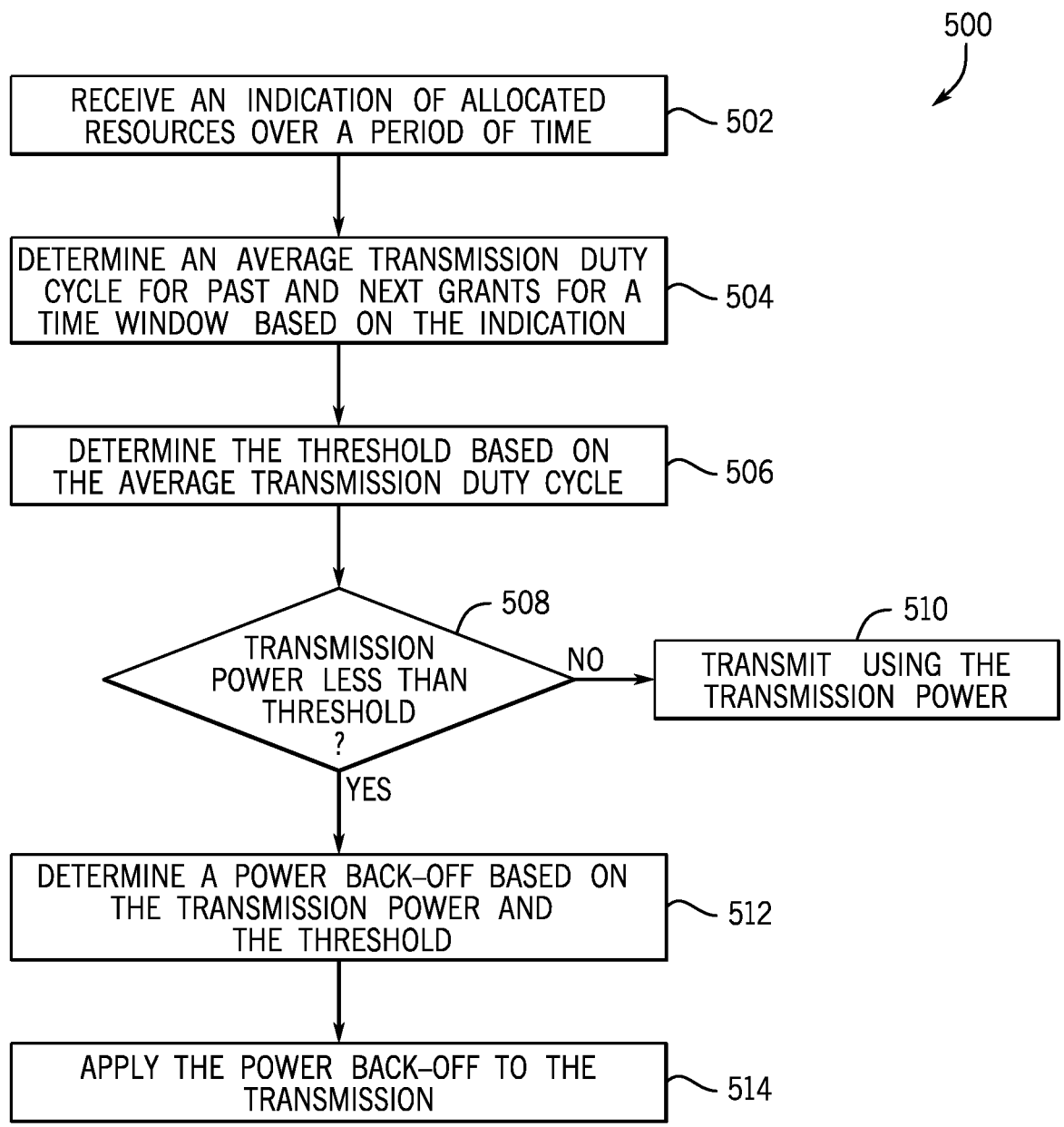
FIG. 12 is a flowchart of a method to transmit with high power by determining a transmission power based on the average duty cycle over a period of time, according to embodiments of the present disclosure.

FIG. 11 is a timing diagram 430 of the user equipment 10 determining an average transmission duty cycle to transmit with high power over a period of time and maintaining high power, according to embodiments of the present disclosure. FIG. 12 is a flowchart of a method 500 to transmit with high power by determining a threshold based on the average transmission duty cycle over a period of time, according to embodiments of the present disclosure. For sake of brevity and clarity, FIGS. 11 and 12 will discussed together below.

In process block 502, the user equipment 10 receives an indication of allocated resources over a period of time, similar to process block 402 described with respect to FIG. 10. For example, the allocated resources may include look-ahead uplink grants. The user equipment 10 may receive multiple look-ahead uplink grants and determine a transmission duty cycle for each look-ahead uplink grant prior to transmission. As illustrated, a first scheduled uplink grant 332A may start at time t=0 and end at time t=t1, a second scheduled uplink grant 332B may start at time t=t1 and end at time t=t2, a third scheduled uplink grant 332C may start at time t=t2 and end at time t=t3, and/or a fourth scheduled uplink grant 332D may start at time t=t3 and end at time t=t4.

In process block 504, the user equipment 10 determines an average transmission duty cycle 432 for past and next scheduled uplink grants for a time window based on the indication. The time window may be a period of time (e.g., the time period 178 described with respect to FIG. 6) for averaging the transmission duty cycles 334 of one or more scheduled uplink grants 332. In another example, the time window may be a period of time defined by regulations, such as 60 seconds or less, 100 seconds, and/or 360 seconds or more (e.g., 360 seconds as defined by SAR regulations). The user equipment 10 may determine the average transmission duty cycle 432 based on past and next scheduled uplink grants 332. For example, the average transmission duty cycle 432 of the first scheduled uplink grant 332A may be determined based on the first scheduled uplink grant 332A. That is, the transmission duty cycle 334 of the first scheduled uplink grant 332A may be 50%. The user equipment 10 may then determine the average transmission duty cycle 432 of the second scheduled uplink grant 332B based on the first scheduled uplink grant 332A and the second scheduled uplink grant 332B. For example, the user equipment 10 may determine the transmission duty cycle of the second scheduled uplink grant 332B and then determine the average the transmission duty cycle 432 based on the transmission duty cycles of the first scheduled uplink grant 332A and the second scheduled uplink grant 332B. For example, the transmission duty cycle of the second scheduled uplink grant 332B may be 28.6% and the average transmission duty cycle 432 may be 39.3% (e.g., (50%+28.6%)/2). In another example, the average transmission duty cycle 432 of the third scheduled uplink grant 332C may be based on the first scheduled uplink grant 332A, the second scheduled uplink grant 332B, and the third scheduled uplink grant 332C. For example, the transmission duty cycle of the third scheduled uplink grant 332C may be 64.3% and the average transmission duty cycle 432 may be 47.6%. In yet another example, the transmission duty cycle 334 of the fourth scheduled uplink grant 332D may be determined based on the first scheduled uplink grant 332A, the second scheduled uplink grant 332B, the third scheduled uplink grant 332C, and the fourth scheduled uplink grant 332D. The transmission duty cycle 334 of the fourth scheduled uplink grant 332D may be 7.1% and the average transmission duty cycle 432 may be 37.5%. In certain instances, the user equipment 10 may store the average transmission duty cycle 432 in a buffer (e.g., uplink buffer) and/or the memory 14.

In process block 506, the user equipment 10 may determine a threshold 336 (e.g., an average threshold) based on the average transmission duty cycle 334. The user equipment 10 may determine the threshold 336 based on Equation 2 above. For example, the user equipment 10 may determine the threshold 336 for the first scheduled uplink grant 332A based on the average transmission duty cycle 432, the threshold 336 for the second scheduled uplink grant 332B based on the associated average transmission duty cycle 432, the threshold 336 for the third scheduled uplink grant 332C based on the associated average transmission duty cycle 432, and/or the threshold 336 for the fourth scheduled uplink grant 332D based the associated average transmission duty cycle 432.

In determination block 508, the user equipment 10 determines if a transmission power is less than the threshold 336, similar to determination block 408 described with respect to FIG. 10. As discussed herein, the user equipment 10 may operate using high power, such as PC2 (e.g., as illustrated by line 344). If the transmission power of the user equipment 10 is below the threshold 336, then the user equipment 10 may apply a power back-off 338 to reduce the transmission power. In certain instances, the user equipment 10 may determine if the transmission power may be greater than a threshold 336 of a next scheduled uplink grant 332 to determine if a power back-off 338 may be applied. Since the transmission power of the user equipment 10 may be averaged over multiple or long periods of time, determining and applying a power back-off for a subsequent scheduled uplink grant may decrease a total amount of power back-off applied in comparison to applying a power back-off to a past scheduled uplink grant.

If the user equipment 10 determines that the transmission power is less than the threshold 336, then in process block 510 the user equipment 10 transmits using the transmission power, similar to process block 510 described with respect to FIG. 10. If the user equipment 10 determines the transmission power is greater than the threshold 336, then in process block 512 the user equipment 10 determines a power back-off 338 based on the transmission power and the threshold 336, similar to process block 412 described with respect to FIG. 10.

In process block 514, the user equipment 10 applies the power back-off 338 to transmission operations, similar to process block 514 described with respect to FIG. 10. In this way, the user equipment 10 may average transmission duty cycles 432 over the period of time. For example, the user equipment 10 may average transmission duty cycles 432 over 10 seconds, 20 seconds, 30 seconds, or any suitable amount of time less than or equal to 360 seconds in accordance with SAR regulations, or greater than 360 seconds.

The method 500 may be performed by any suitable device (e.g., a controller) that may control components of the user equipment 10, such as the processor 12. In some embodiments, the method 500 may be implemented by executing instructions stored in a tangible, non-transitory, computer-readable medium, such as the memory 14 or storage 16, using the processor 12. For example, the method 500 may be performed at least in part by one or more software components, such as an operating system of the user equipment 10, one or more software applications of the user equipment 10, and the like. While the method 500 is described using steps in a specific sequence, it should be understood that the present disclosure contemplates that the described steps may be performed in different sequences than the sequence illustrated, and certain described steps may be skipped or not performed altogether.

Figure 13:
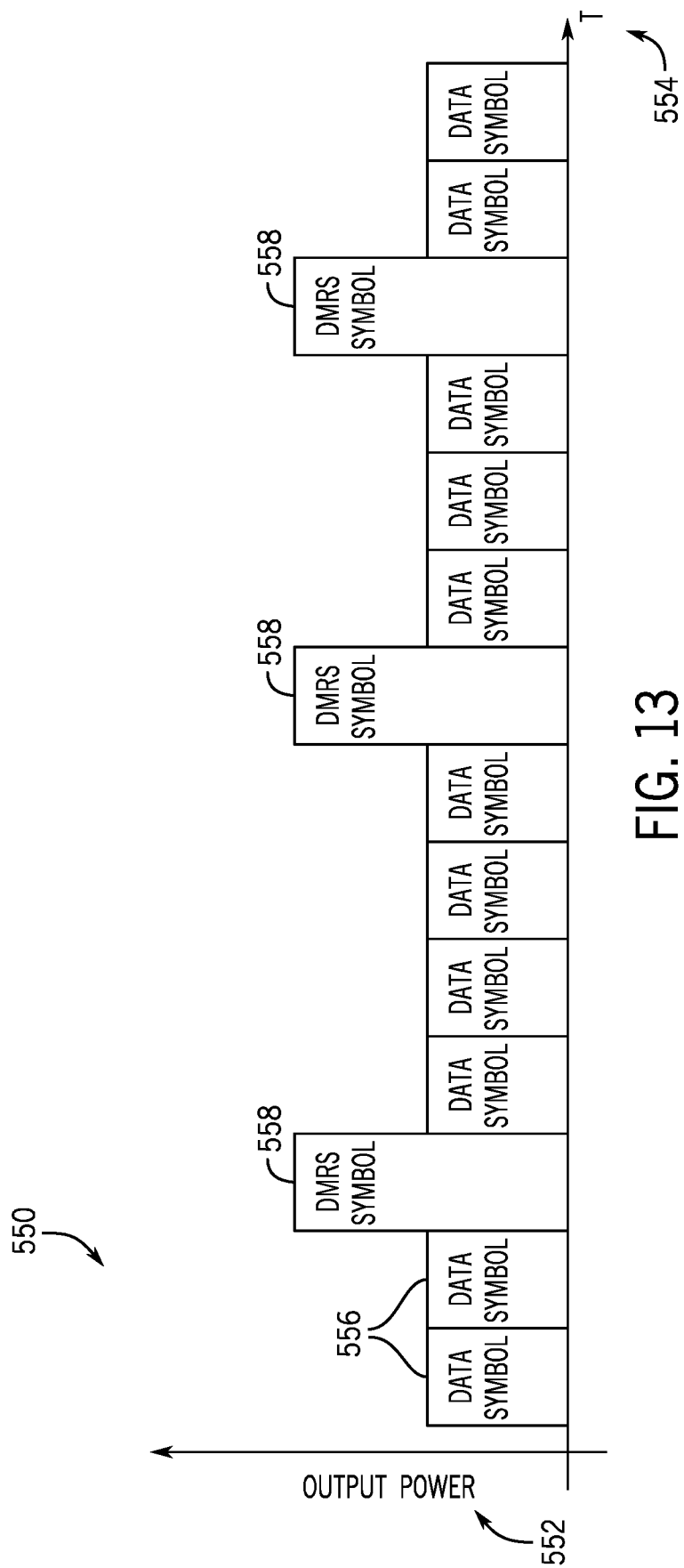
FIG. 13 is a schematic diagram of a time slot for which higher priority uplink symbols are transmitted with high power over time, according to embodiments of the present disclosure.

FIG. 13 is a schematic diagram of a time slot 550 (e.g., data transmitted within the time slot) for which higher priority uplink symbols are transmitted with high power (e.g., transmission power 552) over time 554, according to embodiments of the present disclosure. As illustrated, the time slot 550 may include one or more uplink symbols (e.g., data symbol 556, demodulated reference signal (DMRS) symbols 558) for transmission over time 554. In certain instances, the user equipment 10 may transmit the uplink symbols within the time slot at high power, which may exceed a threshold. For example, the user equipment 10 may operate using PC2, determine that the transmission duty cycle exceeds 50%, and determine a power back-off to apply to decrease the transmission power. In another example, the user equipment 10 may operate using PC1 or PC1.5, determine that the transmission duty cycle exceeds 25%, and determine a power back-off. Rather than transmitting all uplink symbols in the time slot 550 with the power back-off, the user equipment 10 may transmit certain uplink symbols using high power and the remaining uplink symbols at low power, thereby reducing the transmission power used to transmit the time slot 550.

As illustrated, the data within the time slot 550 may include multiple data symbols 556 and multiple DMRS symbols 558. In certain instances, the user equipment 10 may prioritize the DMRS symbols 558 over the data symbols 556 based on a functionality of the uplink symbol. For example, the DMRS symbols 558 may be used for channel estimation and/or phase correction, which may allow the communication node 102 to achieve improved channel estimation, thereby improving uplink performance. In other words, prioritizing the DMRS symbols 558 may allow the communication node 102 to receive data with higher accuracy and reduced loss, thereby improving the connection between the communication node 102 and the user equipment 10. In other instances, the user equipment 10 may prioritize certain aspects of the transmission used for phase estimation, such as the phase tracking reference signal (PT-RS).

The user equipment 10 may prioritize the DMRS symbols 558 by transmitting the symbol using high power. To reduce the total transmission power over the time slot 550, the user equipment 10 may transmit the data symbols 556 using low power. As illustrated, the transmission power 552 used to transmit the DMRS symbols 558 may be greater than the transmission power 552 used to transmit the data symbols 556. In this way, the total transmission power used to transmit data during the time slot 550 may be reduced. By prioritizing certain uplink symbols, the transmission range and/or quality between the user equipment 10 and the communication node 102 may be improved while still meeting emission thresholds.

Figure 14:
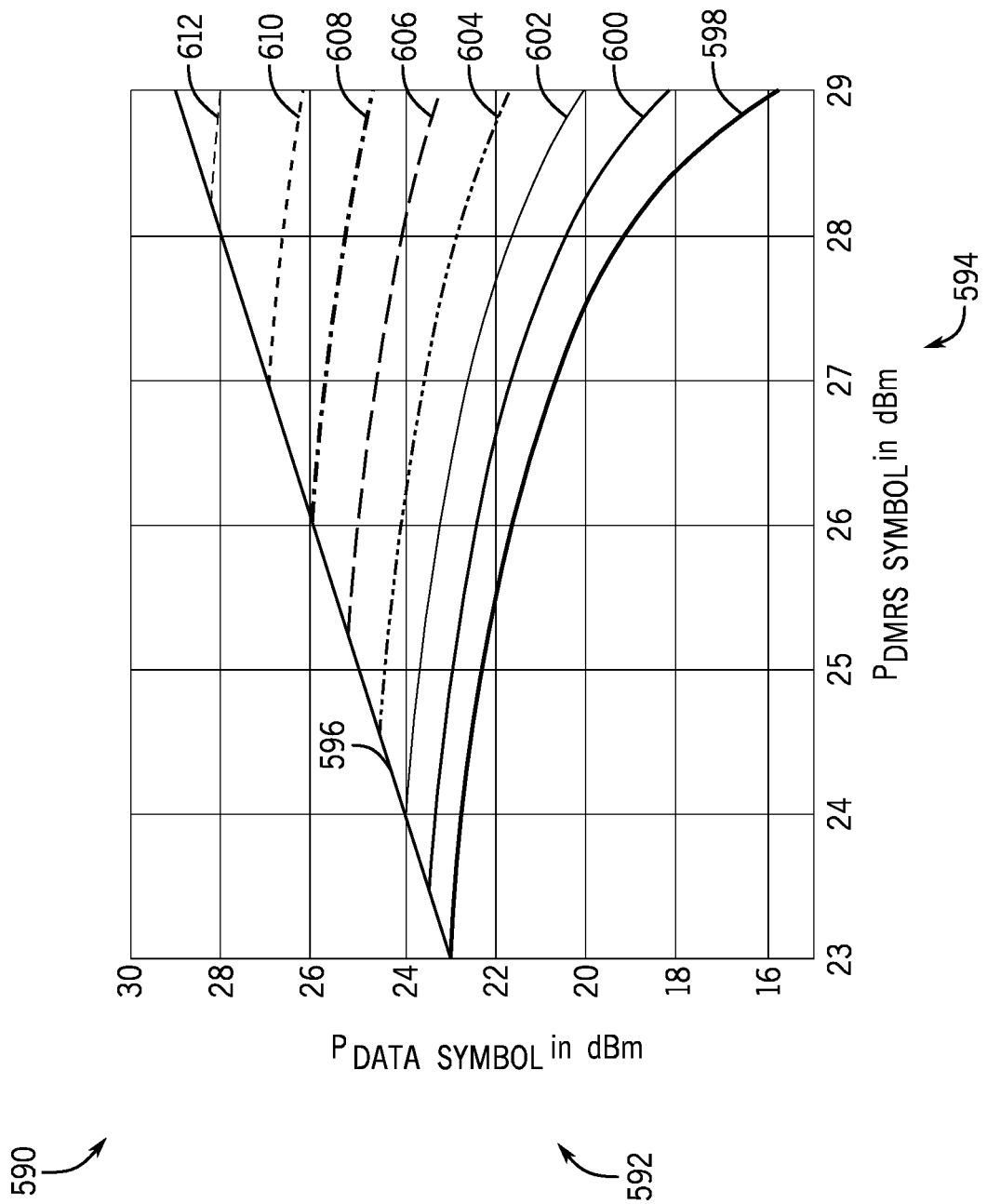
FIG. 14 is a plot of transmission power for data symbols over transmission power as related to demodulated reference signal (DMRS) symbols, according to embodiments of the present disclosure.

FIG. 14 is a plot 590 of transmission power for the data symbols 592 as related to transmission power for the DMRS symbols 594, according to embodiments of the present disclosure. In particular, the plot 590 illustrates a relationship between the transmission power of the data symbols 592 and the transmission power of three DMRS symbols 594 to achieve an average transmission power of +23 dBm (e.g., transmission power over the time slot 550). Although the example includes three DMRS symbols, any suitable number of DMRS symbols may be used during transmission.

Returning to the plot 590, the line 596 may illustrate equal transmission power for transmitting the DMRS symbols and the data symbols. Indeed, when the transmission power for the DMRS symbol 594 is +24 dBm, the transmission power for the data symbol 592 may also be +24 dBm. When the transmission power for the DMRS symbol 594 is +27 dBm, the transmission power for the data symbol 592 may also be +27 dBm.

As illustrated, the line 598 may represent a duty cycle of 100%. That is, every slot within the time slot 550 may be entirely filled with uplink symbols for transmission. As illustrated by the line 598, the transmission power of the DMRS symbols 594 may be +23 dBm and the transmission power of the data symbols 592 may also be +23 dBm. In certain instances, the DMRS symbols may be prioritized by increasing power used during transmission. For example, increasing the transmission power of the DMRS symbols 594 to +25 dBm may result in decreasing the transmission power of the data symbols 592 to +22.2 dBm. In this way, the average transmission power of the time slot 550 may remain at +23 dBm.

Returning to the plot 590, the line 600 may illustrate a duty cycle of 90%, the line 602 may illustrate a duty cycle of 80%, the line 604 may illustrate a duty cycle of 70%, the line 606 may illustrate a duty cycle of 60%. As the duty cycle decreases, the transmission power of the DMRS symbols 594 and the transmission power of the data symbols 592 may increase. Moreover, increasing the transmission power of the DMRS symbols 594 may decrease the transmission power of the data symbols 592.

In an example, the line 608 may illustrate a duty cycle of 50%. For example, every other slot within the time slot 550 may include one uplink symbol. With a lower duty cycle, the total transmission power of the time slot 550 may be increased. For example, the DMRS symbols may be transmitted at +27 dBm and the data symbols may be transmitted at +25.7 dBm.

Returning to the plot 590, the line 610 may illustrate a duty cycle of 40%, and the line 612 may illustrate a duty cycle of 30%. For a duty cycle of 30%, every three slots or less of the time slot 550 may include one uplink symbol. As such, the transmission power of transmissions during the time slot 550 may be increased. As illustrated by line 612, the transmission power of the DMRS symbols 594 may be +29 dBm and the transmission power of the data symbols 592 may be +28.0 dBm. In this way, the transmission power for one time slot 550 may be determined.

Figure 15:
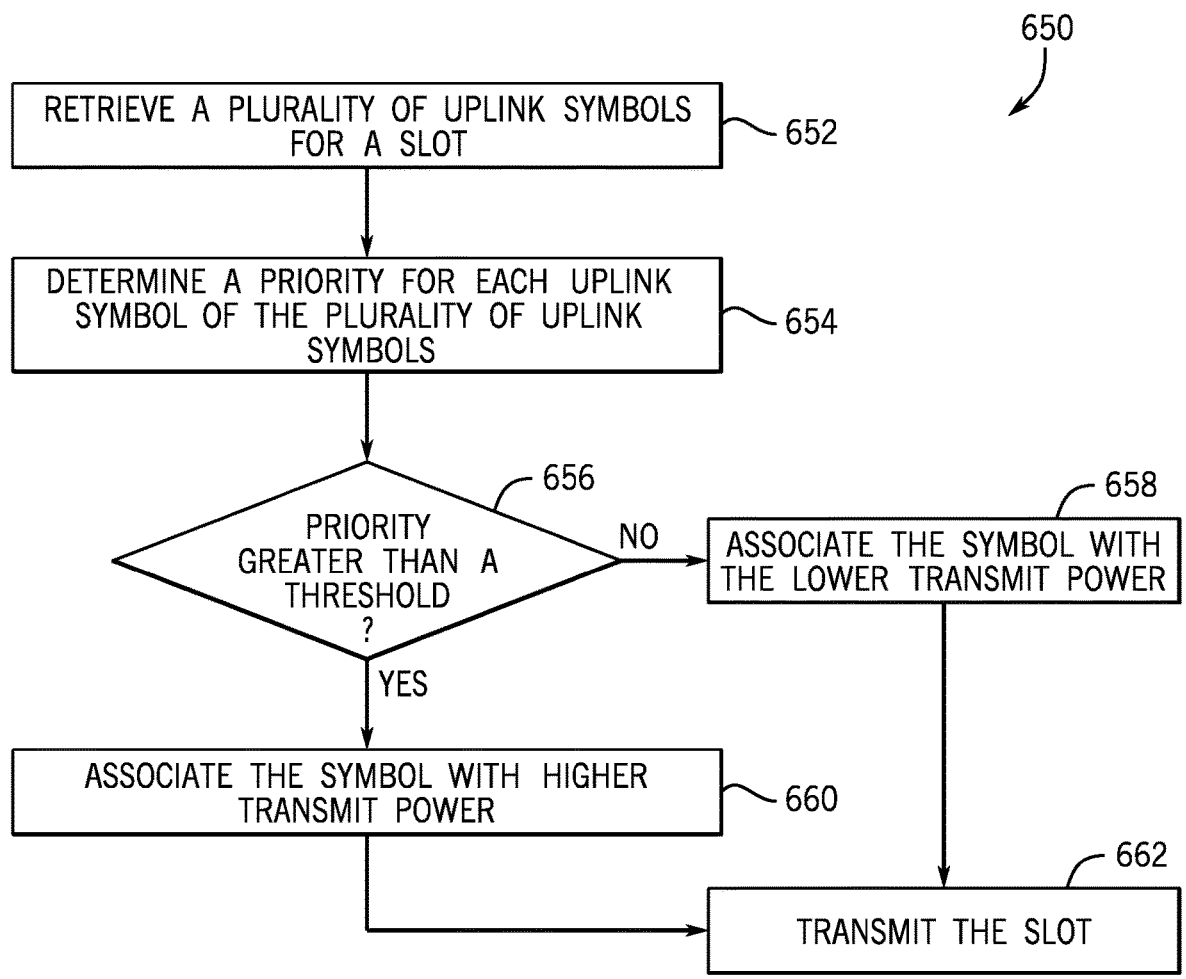
FIG. 15 is a flowchart of a method to transmit with high power based on a priority of the uplink symbols of FIGS. 13 and 14, according to embodiments of the present disclosure.

FIG. 15 is a flowchart of a method 650 to transmit with high power based on a priority of the uplink symbols, according to embodiments of the present disclosure. For example, the uplink symbols may include a demodulated reference signal (DMRS) symbol, a phase tracking reference signal (PT-RS), a channel state information reference signal (CSI-RS) symbol, a sound reference signal (SRS) symbol, a data symbol, and the like. Each symbol may provide a different function during transmission. In certain instances, the user equipment 10 may determine a priority of the uplink symbol. If the priority of the uplink symbol is greater than a threshold, then the user equipment may transmit the uplink symbol using high power. If the priority of the uplink symbol is less than a threshold, then the user equipment 10 may transmit the uplink symbol using low power. As such, the user equipment 10 may reduce a total transmission power of the slot, but transmit certain uplink symbols using high power.

In process block 652, the user equipment 10 receives a plurality of symbols for a time slot (e.g., time slot 550 described with respect to FIG. 13). The user equipment 10 may retrieve one or more uplink symbols associated with a slot for transmission. For example, the slot may be a physical uplink shared channel (PUSCH) slot configured with three DMRS symbols. In another example, the slot may include multiple data symbols and a certain PT-RS density.

In process block 654, the user equipment 10 determines a priority for each uplink symbol of the plurality of uplink symbols. For example, the user equipment 10 may determine the priority based on a function of the uplink symbol. As discussed herein, the user equipment 10 may prioritize uplink symbols used for channel estimation and decoding over other uplink symbols. In another example, the user equipment 10 may prioritize uplink symbols for increasing signal-to-noise ratio and/or improving channel and phase estimation. That is, the uplink symbols used for channel estimation may be assigned a high priority and remaining uplink symbols may be assigned a low priority. Still in another example, uplink symbols for phase estimation may receive a high priority or a medium priority. In certain instances, the user equipment 10 may assign a value to the uplink symbol based on the function. For example, the user equipment 10 may assign a high value (e.g., 1) for uplink symbols used for channel and phase estimation and a low value (e.g., 0) for remaining symbols. In other instances, the user equipment 10 may store a relationship between one or more uplink symbols and a priority level (e.g., priority value) for each uplink symbol in a data structure (e.g., lookup table) stored in the memory 14 and/or the storage device 16. The user equipment 10 may determine the priority level of the uplink symbol by querying the data structure.

In determination block 656, the user equipment 10 determines if a priority is greater than a threshold. Uplink symbols assigned a priority equal to or above the threshold may be transmitted using high power and uplink symbols assigned a priority below the threshold may be transmitted using low power. For example, the user equipment 10 may determine that the priority for DMRS symbols may be greater than the threshold based on the functionality of the symbol. In another example, the user equipment 10 may determine the priority for PT-RS may be greater than the priority of data symbols based on the functionality of the symbols.

If the user equipment 10 determines that the priority is equal to or greater than a threshold, then in process block 658 the user equipment 10 associates the uplink symbol with high power. For example, the user equipment 10 may assign a high transmission power to prioritized uplink symbols in comparison to the remaining uplink symbols. In certain instances, the high transmission power may be greater than PC2. Additionally or alternatively, the user equipment 10 may determine the transmission power of the remaining uplink symbols based on (e.g., to be lower than) the high transmission power assigned to the prioritized uplink symbols.

If the user equipment 10 determines that the priority is less than a threshold, then in process block 660 the user equipment 10 may associate the symbol with low power. As described with respect to FIG. 14, the user equipment 10 may determine the transmission power for the symbols below the threshold based on (e.g., to be lower than) the high transmission power assigned to the prioritized uplink symbols.

In process block 662, the user equipment 10 transmits the slot (e.g., the data in the slot). For example, the user equipment 10 may transmit one or more uplink symbols in the time slot. The user equipment 10 may transmit one or more high priority uplink symbols using high power and switch to transmitting one or more low priority uplink symbols using low power. The user equipment 10 may determine the total transmission power during the time slot to be below a threshold value, or +23 dBm. The user equipment 10 may improve a communication range and/or reliability by increasing transmission power of certain uplink symbols and maintain transmissions in accordance with the regulations by decreasing transmission power of other uplink symbols.

The method 650 may be performed by any suitable device (e.g., a controller) that may control components of the user equipment 10, such as the processor 12. In some embodiments, the method 650 may be implemented by executing instructions stored in a tangible, non-transitory, computer-readable medium, such as the memory 14 or storage 16, using the processor 12. For example, the method 650 may be performed at least in part by one or more software components, such as an operating system of the user equipment 10, one or more software applications of the user equipment 10, and the like. While the method 650 is described using steps in a specific sequence, it should be understood that the present disclosure contemplates that the described steps may be performed in different sequences than the sequence illustrated, and certain described steps may be skipped or not performed altogether.

Figure 16:
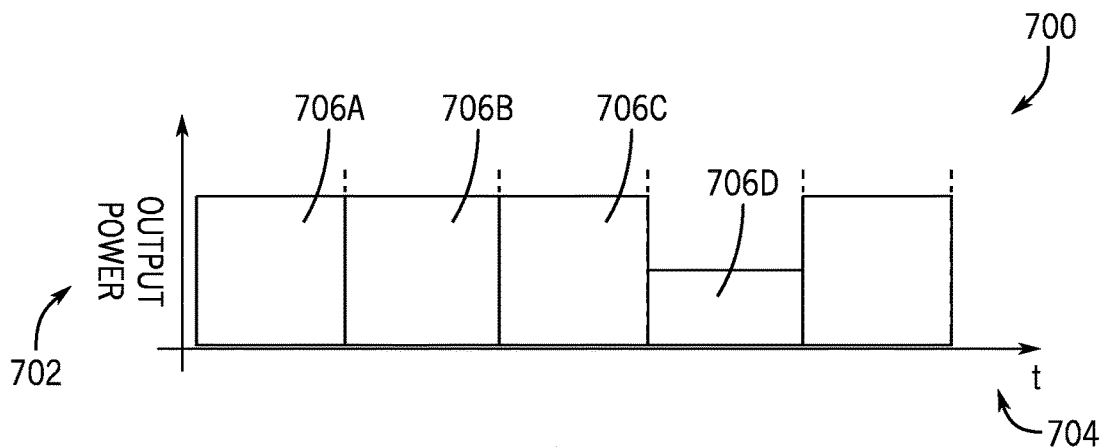
FIG. 16 is a schematic diagram of a channel including multiple repetitions of one slot of data and associated transmission power, according to embodiments of the present disclosure.
Figure 17:
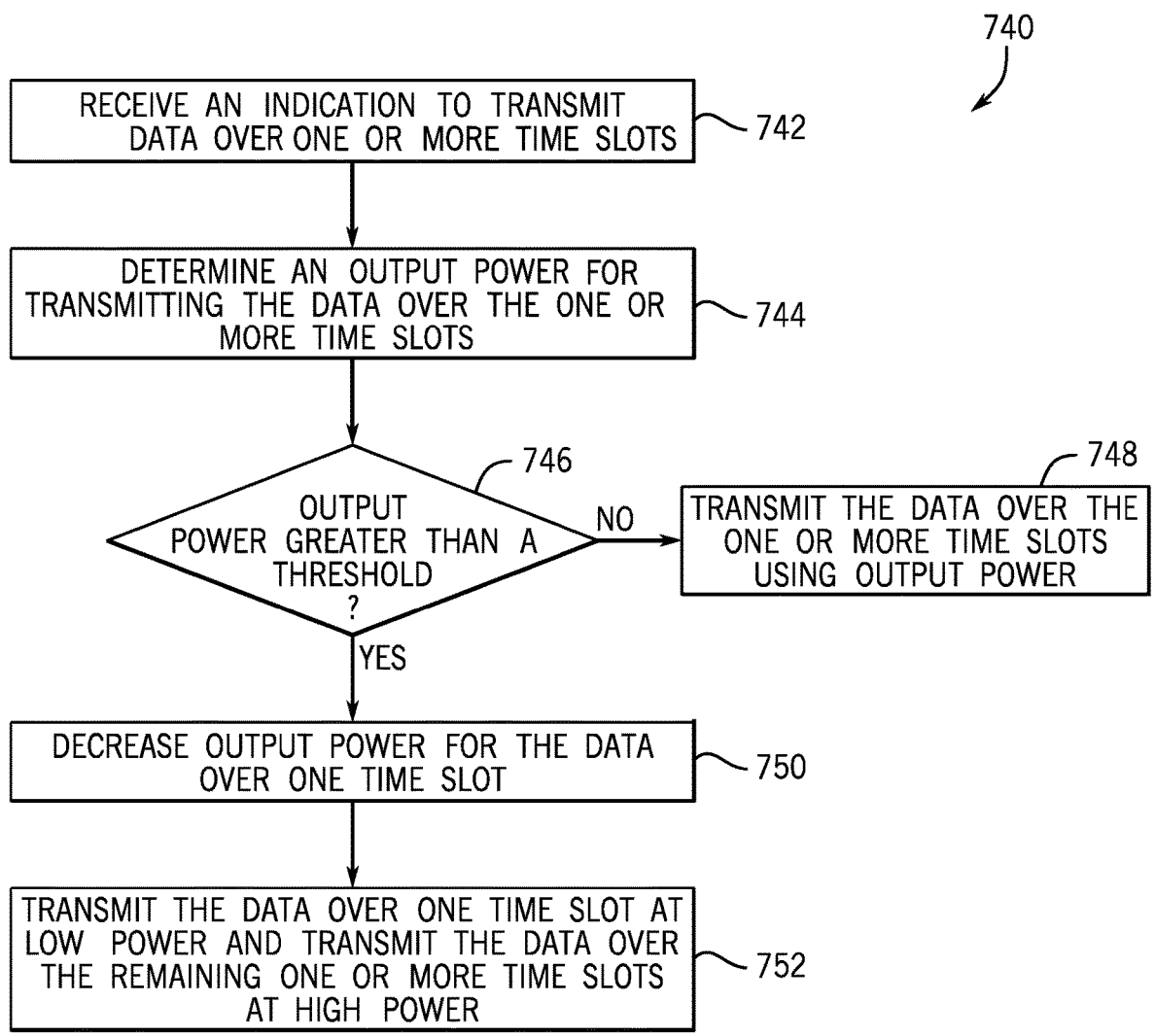
FIG. 17 is a flowchart of a method to transmit with high power by reducing transmission power for repeated data, according to embodiments of the present disclosure.

FIG. 16 is a schematic diagram of a channel 700 including multiple time slots 706 (e.g., data associated with the time slot) and associated transmission power 702 over time 704, according to embodiments of the present disclosure. FIG. 17 is a flowchart of a method 740 to transmit with high power by reducing transmission power for repeated data, according to embodiments of the present disclosure. For sake of brevity and clarity, FIGS. 16 and 17 will be discussed together. In certain instances, the user equipment 10 may be configured to repeatedly transmit data over time. For example, the user equipment 10 may transmit same data over a first time slot 706A, a second time slot 706B, a third time slot 706C, a fourth time slot 706D, and so on using the channel 700 (e.g., channel allocated to the user equipment 10 by the communication node 102). In certain instances, the user equipment 10 may transmit the data using high power. As such, a total transmission power for transmitting the repetitions of data may be greater than a threshold (e.g., as defined by the regulations). As such, the user equipment 10 may decrease transmission power used to transmit one or more repetitions of the data to avoid applying a power back-off to the transmission or avoid transmitting all repetitions of the data at low power.

With the foregoing in mind, in process block 742, the user equipment 10 receives an indication to transmit data over one or more time slots. For example, the user equipment 10 may receive the indication via the receivers 54 from the communication node 102 to repeatedly transmit the data over one or more time slots. In another example, the user equipment 10 may receive the indication to transmit one set of data repeatedly, such over two time slots, three time slots, four time slots, six time slots, and so on. As illustrated, the data may be transmitted over five time slots 706 of the channel 700.

In process block 744, the user equipment 10 determines a transmission power for transmitting the data over the one or more time slots. For example, the user equipment 10 may operate using high power and transmit the data over the five time slots 706 using high power. The user equipment 10 may determine an average transmission power for transmitting the data over time (e.g., total time associated with the five time slots 706). In another example, the user equipment 10 may determine the transmission power for each uplink symbol for transmitting to determine the transmission power for transmitting over the time slot and determine the transmission power for transmitting over the five time slots 706. In certain instances, the communication node 102 may receive the repeatedly transmitted data via one or more receivers and may aggregate the repeatedly transmitted data. However, the communication node 102 may receive the data with a phase estimation error and/or a channel estimation error as phase and channel change from one time slot to the next time slot. Moreover, for NTN communication, the phase may change rapidly due to movement of the communication node 102 and/or the user equipment 10. As such, transmitting the data using high power may improve a signal-to-noise ratio, which may improve phase estimation and channel estimation and accuracy of the aggregated data.

In determination block 746, the user equipment 10 determines if the transmission power is greater than a threshold. For example, the user equipment 10 may determine if the average transmission power for transmitting data over the five time slots 706 using high power over time may be greater than a threshold. In certain instances, the user equipment 10 may transmit the data using PC3. As such, the average transmission power over the five time slots 706 may not be greater than the threshold. In another instance, the user equipment 10 may transmit the data using PC2 and the average transmission power over the five time slots 706 may be greater than the threshold.

If the transmission power is not greater than the threshold, then in process block 748, the user equipment 10 transmits the data over the one or more time slots using the transmission power. For example, the user equipment 10 may operate using PC3 and transmit data over the time slots using PC3.

If the transmission power is greater than the threshold, then in process block 750, the user equipment 10 decreases transmission power for the data over one time slot. For example, the user equipment 10 may operate using PC1, PC1.5, and/or PC2, which may cause the average transmission power over the four time slots 706 to be greater than the threshold. As such, the user equipment 10 may decrease the transmission power for transmitting the data over one time slot 706. For example, the user equipment 10 may reduce the transmission power over one time slot 706 such that the average transmission power over the four time slots may be below the threshold value. In this way, the user equipment 10 may reduce the average transmission power over the four time slots 706 and the average transmission power may fall below the threshold.

In process block 752, the user equipment 10 transmits the data over one time slot at low power and transmits the data over the remaining one or more time slots at high power. As illustrated in the channel 700, the transmission power for transmitting the data over the fourth time slot 706D may be decreased. In certain instances, reducing the transmission power for the data may increase estimation error for the phase estimation and/or the channel estimation. However, the data may be repeated over three time slots 706, which improves the aggregated data and improves phase estimation and/or channel estimation. As such, the estimation error of the data transmitted in the fourth time slot 706D may be reduced or improved. Moreover, the user equipment 10 may reduce transmission power and transmit data in accordance with the regulations.

In certain instances, slot aggregation may be configured by radio resource control (RRC) protocol signaling. In other instances, certain control channels may be prioritized to improve signal-to-noise ratio at one or more receivers of the communication node. To this end, the communication node 102 and/or the user equipment 10 may prioritize transmissions on a physical uplink control channel (PUCCH channel), thereby increasing communication range and/or reliability.

The method 740 may be performed by any suitable device (e.g., a controller) that may control components of the user equipment 10, such as the processor 12. In some embodiments, the method 740 may be implemented by executing instructions stored in a tangible, non-transitory, computer-readable medium, such as the memory 14 or storage 16, using the processor 12. For example, the method 740 may be performed at least in part by one or more software components, such as an operating system of the user equipment 10, one or more software applications of the user equipment 10, and the like. While the method 740 is described using steps in a specific sequence, it should be understood that the present disclosure contemplates that the described steps may be performed in different sequences than the sequence illustrated, and certain described steps may be skipped or not performed altogether.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A user equipment, comprising:
a transceiver; and
processing circuitry coupled to the transceiver and configured to
detect a first communication node using the transceiver,
synchronize to the first communication node using the transceiver,
receive an indication of a first uplink grant using the transceiver,
transmit first data using the transceiver at a transmit power over a first period of time based on the first uplink grant,
reduce an amount of second data within an uplink buffer based on the transmit power over the first period of time being greater than a threshold, and
transmit a second indication of the second data to the first communication node using the transceiver.

2. The user equipment of claim 1, wherein the processing circuitry is configured to generate a buffer status report based on the amount of the second data.

3. The user equipment of claim 2, wherein the second indication indicates the buffer status report.

4. The user equipment of claim 1, wherein the processing circuitry is configured to receive a third indication of a second uplink grant over a second period of time using the transceiver, a frequency of the second uplink grant being less than a frequency of the first uplink grant.

5. The user equipment of claim 4, wherein the processing circuitry is configured to increase an amount of third data within the uplink buffer based on an average transmit power over the second period of time being below the threshold.

6. The user equipment of claim 5, wherein the processing circuitry is configured to transmit the third data using the transmit power over the second period of time based on the second uplink grant.

7. The user equipment of claim 1, wherein reducing the amount of the second data within the uplink buffer comprises removing the second data from the uplink buffer based on determining that a priority of the second data within the uplink buffer is below a priority threshold.

8. The user equipment of claim 1, wherein the processing circuitry is configured to
store a third indication of the transmit power in a memory of the user equipment, and
determine an average transmit power based on the third indication and the first uplink grant.

9. The user equipment of claim 1, wherein the threshold comprises 23 decibel-milliwatts.

10. A method, comprising:
receiving, via a receiver of a user equipment, a first indication of a first uplink grant comprising a first uplink allocation frequency for the user equipment;
adjusting, via processing circuitry of the user equipment, an amount of data within an uplink buffer based on an average transmission power being above a threshold; and
transmitting, via a transmitter of the user equipment, a buffer status report comprising the amount of data within the uplink buffer.

11. The method of claim 10, wherein adjusting, via the processing circuitry of the user equipment, the amount of data within the uplink buffer comprises
determining a priority of first data being below a priority threshold,
removing the first data from the uplink buffer, and
storing second data in the uplink buffer based on a priority of the second data being above the priority threshold.

12. The method of claim 10, comprising, receiving, via the receiver, a second indication of a second uplink grant comprising a second uplink allocation frequency for the user equipment, the second uplink allocation frequency being less than the first uplink allocation frequency.

13. The method of claim 11, comprising storing, via the processing circuitry, a second indication of one or more transmission power used to transmit the second data within the uplink buffer.

14. A tangible, non-transitory computer-readable medium, comprising instructions that, when executed by one or more processors, are configured to cause the one or more processors to:
establish a connection with a network;
cause a receiver of a user equipment to receive an indication of a plurality of scheduled uplink grants and a transmission power;
determine a duty cycle for each of the scheduled uplink grants and a threshold based on the indication; and
cause a transmitter of the user equipment to transmit data to the network using the transmission power based on the transmission power being less than the threshold and the duty cycle.

15. The tangible, non-transitory computer-readable medium of claim 14, wherein the instructions are configured to cause the one or more processors to determine the duty cycle for each of the scheduled uplink grants and the threshold by determining a number of time slots within each of the plurality of scheduled uplink grants.

16. The tangible, non-transitory computer-readable medium of claim 14, wherein the instructions are configured to cause the one or more processors to determine the duty cycle for each of the scheduled uplink grants and the threshold by determining a first duty cycle for a first scheduled uplink grant of the plurality of scheduled uplink grants based on the first scheduled uplink grant and past scheduled uplink grants.

17. The tangible, non-transitory computer-readable medium of claim 16, wherein the instructions are configured to cause the one or more processors to:
determine a second duty cycle for a second scheduled uplink grant of the plurality of scheduled uplink grants based on the second scheduled uplink grant, the first scheduled uplink grant, and the past scheduled uplink grants;
determine a second threshold based on the second duty cycle; and
cause the transmitter to transmit the data to the network using a power back-off based on the transmission power being greater than the second threshold.

18. The tangible, non-transitory computer-readable medium of claim 17, wherein the instructions are configured to cause the one or more processors to store the first duty cycle and the second duty cycle in a memory of the user equipment.

19. The tangible, non-transitory computer-readable medium of claim 14, wherein the instructions are configured to the one or more processors to cause the transmitter to transmit additional user data to the network using a power back-off based on an additional transmission power of the user equipment being greater than the threshold.

20. The tangible, non-transitory computer-readable medium of claim 14, wherein the instructions are configured to cause the one or more processors to:

determine a second duty cycle based on the transmission power; and cause the transmitter to transmit the data to the network using the transmission power and the second duty cycle.

\* \* \* \* \*